(12) United States Patent
Yanagisawa

(10) Patent No.: US 10,656,508 B2
(45) Date of Patent: May 19, 2020

(54) PROJECTOR AND OPERATION CONTROL METHOD

(71) Applicant: SEIKO EPSON CORPORATION, Tokyo (JP)

(72) Inventor: Yoshiyuki Yanagisawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/260,366

(22) Filed: Jan. 29, 2019

(65) Prior Publication Data

US 2019/0235366 A1    Aug. 1, 2019

(30) Foreign Application Priority Data

Jan. 30, 2018 (JP) ................. 2018-013824
Oct. 26, 2018 (JP) ................. 2018-201565

(51) Int. Cl.

| G03B 21/16 | (2006.01) |
| H04N 9/31 | (2006.01) |
| G03B 21/14 | (2006.01) |
| G02F 1/1335 | (2006.01) |
| G03B 21/20 | (2006.01) |
| G03B 21/00 | (2006.01) |

(52) U.S. Cl.
CPC .......... *G03B 21/16* (2013.01); *G02F 1/1335* (2013.01); *G03B 21/006* (2013.01); *G03B 21/145* (2013.01); *G03B 21/2006* (2013.01); *G03B 21/208* (2013.01); *H04N 9/3144* (2013.01)

(58) Field of Classification Search
CPC ..... G03B 21/16; G03B 21/145; H04N 9/3144
USPC .......................................................... 353/54
See application file for complete search history.

(56) References Cited

U.S. PATENT DOCUMENTS

| 7,218,300 B2 | 5/2007 | Shimizu |
| 8,651,668 B2 | 2/2014 | Yanagisawa et al. |
| 2004/0196233 A1 | 10/2004 | Shimizu |
| 2008/0225188 A1* | 9/2008 | Hoshino ........... G02F 1/133385 349/8 |
| 2009/0052135 A1* | 2/2009 | Uchida ................... G06F 1/203 361/699 |
| 2010/0245778 A1 | 9/2010 | Yanagisawa et al. |
| 2017/0273223 A1 | 9/2017 | Saito |

FOREIGN PATENT DOCUMENTS

| JP | H11-282361 A | 10/1999 |
| JP | 2002-131737 A | 5/2002 |
| JP | 2002-236277 A | 8/2002 |

(Continued)

*Primary Examiner* — Ryan D Howard
(74) *Attorney, Agent, or Firm* — Oliff PLC

(57) ABSTRACT

A projector includes a light source, a light modulation device configured to modulate a light output from the light source, a projection optical device configured to project the light modulated by the light modulation device, a casing containing at least a part of the light modulation device and having an interior filled with a cooling liquid, a circulating device configured to circulate the cooling liquid at least to a light exiting side of a modulation part in the light modulation device, and a control device configured to control an operation of the circulating device. The control device changes an operation level of the circulating device.

9 Claims, 10 Drawing Sheets

(56) References Cited

FOREIGN PATENT DOCUMENTS

| | | | |
|---|---|---|---|
| JP | 2002-244101 | A | 8/2002 |
| JP | 2002-258245 | A | 9/2002 |
| JP | 2004-317682 | A | 11/2004 |
| JP | 2005-183585 | A | 7/2005 |
| JP | 2006-017833 | A | 1/2006 |
| JP | 2006-098759 | A | 4/2006 |
| JP | 2006-106250 | A | 4/2006 |
| JP | 2006-330641 | A | 12/2006 |
| JP | 2006-330642 | A | 12/2006 |
| JP | 2010-224439 | A | 10/2010 |
| JP | 2012-198401 | A | 10/2012 |
| JP | 2012-198402 | A | 10/2012 |
| JP | 5853072 | B1 | 2/2016 |
| JP | 2016-195215 | A | 11/2016 |

* cited by examiner

PROJECTOR AND OPERATION CONTROL METHOD

BACKGROUND

1. Technical Field

The present invention relates to a projector and operation control method.

2. Related Art

In related art, projectors including light sources, light modulation devices that modulate lights output from the light sources and form images according to image information, and projection optical devices that enlarge and project the formed images are known. As the projector, a projector including a cooling structure that cools an object to be cooled using a refrigerant in a liquid form is known (for example, see Patent Document 1 (JP-A-2002-131737)).

The projector described in Patent Document 1 includes three liquid crystal display units into which respective color lights of red, green, and blue are entered, a prism that combines images formed by the three liquid crystal display units, a cooling container in a square box shape in which the units and the prism are placed, a refrigerant enclosed within the cooling container, and stirring means for forcibly circulating the refrigerant.

Of the elements, each liquid crystal display unit has a liquid crystal panel, and a light incident-side polarizer and a light exiting-side polarizer. The light incident-side polarizer is located on the light incident side of the liquid crystal panel, and the light exiting-side polarizer is located on the light exiting side of the liquid crystal panel and placed on a light incident surface (side surface) for the corresponding color light in the prism.

In the projector, the refrigerant is moved with a flow generated by the stirring means while absorbing heat generated in the light incident-side polarizers, the liquid crystal panels, and the light exiting-side polarizers. In this manner, the refrigerant circulates along the respective polarizers and liquid crystal panels as objects to be cooled, and thereby, the respective liquid crystal display units are cooled.

Here, the refractive index of the refrigerant changes depending on the temperature of the refrigerant. On the other hand, at the start of use of the projector, the temperature of the refrigerant is lower and, after a lapse of time after the start of use, the temperature of the refrigerant becomes higher. That is, the refractive indexes of the refrigerant differ at the start of use of the projector and the time after a lapse of time after the start of use. Accordingly, there is a problem that, when focus adjustment of the image projected by the projector is performed at the time closer to the start of use of the projector, the projected image becomes out of focus and blurred due to changes in refractive index with the temperature rise of the refrigerant.

SUMMARY

An advantage of some aspects of the invention is to provide a projector and operation control method that may suppress production of a focus shift.

A projector according to a first aspect of the invention includes a light source, a light modulation device configured to modulate a light emitted from the light source, a projection optical device configured to project the light modulated by the light modulation device, a casing containing at least a part of the light modulation device and having an interior filled with a cooling liquid, a circulating device configured to circulate the cooling liquid at least to a light exiting side of a modulation part in the light modulation device, and a control device configured to control an operation of the circulating device, wherein the control device changes an operation level of the circulating device.

Note that, when the operation level of the circulating device is higher, the cooling liquid within the casing circulates at a higher flow rate, and, when the operation level is lower, the cooling liquid circulates at a lower flow rate.

According to the configuration, for example, the control device lowers the operation level of the circulating device at the start of lighting of the light source so that the cooling liquid within the casing may not largely flow, and thereby, the temperature of the cooling liquid may be quickly raised near the modulation part at the temperature rising with incidence of light from the light source. Accordingly, even in the case where focus adjustment of the projected image by the projection optical device is performed at the time closer to the start of lighting, the difference between the temperature of the cooling liquid at the time and the temperature of the cooling liquid at the time of stably cooling the light modulation device may be made smaller. Thereby, the difference between the refractive indexes of the cooling liquid at the respective times may be made smaller. Therefore, the difference between the refractive indexes of the cooling liquid at the respective times in a region through which the light entering the projection optical device passes may be made smaller, and thereby, production of a significant focus shift may be suppressed.

In the first aspect, it is preferable that the control device alternately executes a first control of controlling the operation of the circulating device at a first operation level and a second control of controlling the operation of the circulating device at a second operation level, and a velocity of the cooling liquid circulating on the light exiting side of the modulation part when the circulating device is controlled at the second operation level is higher than a velocity of the cooling liquid circulating on the light exiting side of the modulation part when the circulating device is controlled at the first operation level.

According to the configuration, the first control and the second control are alternately executed by the control device and the velocity of the cooling liquid circulated by the circulating device is changed, and thereby, the temperature of the modulation part, i.e., the temperature of the cooling liquid near the modulation part may be easily maintained independent of the environmental temperature or the like. Therefore, the light modulation device may be stably operated.

In the first aspect, it is preferable that the control device executes the first control during a predetermined period after a start of lighting of the light source.

According to the configuration, the cooling liquid at the lower flow rate circulates in the modulation part of the light modulation device, and thereby, the temperature of the cooling liquid near the modulation part may be easily raised. Therefore, the temperature of the cooling liquid near the modulation part may be quickly raised and production of the focus shift may be suppressed.

In the first aspect, it is preferable that the control device stops the operation of the circulating device in the first control executed during the predetermined period.

According to the configuration, the temperature of the cooling liquid near the modulation part may be easily raised. Therefore, production of the focus shift may be suppressed.

In the first aspect, it is preferable that the control device changes a length of the predetermined period based on a gradation of an image according to image information input to the light modulation device.

Here, in the case where a configuration including a liquid crystal panel and a polarizer placed at the downstream in the optical path of the liquid crystal panel is employed as the light modulation device, the temperature of the light modulation device changes not only depending on the amount of incident luminous flux but also the gradation of the formed image. For example, when the gradation of the formed image is a gradation closer to black, the amount of light absorbed by the polarizer is larger, and the temperature of the light modulation device is more likely to be higher and the temperature of the cooling liquid near the modulation part is is more likely to be higher. When the gradation of the formed image is a gradation closer to white, the amount of light absorbed by the polarizer is smaller, and the temperature of the light modulation device is less likely to be higher and the temperature of the cooling liquid near the modulation part is less likely to be higher.

On the other hand, according to the above described configuration, for example, when the gradation of the image formed by the light modulation device is a gradation closer to white, the predetermined period may be made longer, and thereby, the period in which the operation level of the circulating device is the first operation level after the start of lighting of the light source may be made longer. In this case, as described above, the temperature of the cooling liquid may be easily raised and production of the focus shift may be suppressed.

In the first aspect, it is preferable that the control device changes the operation level of the circulating device based on an elapsed time after the start of lighting of the light source.

Here, the rate of temperature rise of the cooling liquid after the start of lighting of the light source may be acquired in advance by an experiment or the like.

Therefore, according to the configuration, the temperature of the cooling liquid may be estimated by timing of the elapsed time. Thus, the temperature of the cooling liquid may be controlled without a detection device such as a sensor that measures the state of the cooling liquid and the state of the projected image or the like.

In the first aspect, it is preferable that the control device changes the operation level based on both the elapsed time and a gradation of an image according to image information input to the light modulation device.

According to the configuration, for example, when the gradation of the formed image is a gradation closer to white, the period in which the operation level of the circulating device is the first operation level after the start of lighting of the light source is made longer, and thereby, the temperature of the cooling liquid may be easily raised. Therefore, production of the focus shift may be suppressed.

In the first aspect, it is preferable that the projector includes a detection device configured to detect a temperature of the cooling liquid is provided, and the control device changes the operation level based on the temperature of the cooling liquid detected by the detection device.

According to the configuration, the operation of the circulating device may be controlled according to the temperature of the cooling liquid, and thereby, the temperature control of the cooling liquid may be appropriately performed. Therefore, not only the suppression of the production of the focus shift but also the cooling of the light modulation device may be performed.

In the first aspect, it is preferable that the control device changes the operation level so that the temperature of the cooling liquid falls within a predetermined temperature range.

According to the configuration, the temperature of the light modulation device cooled by the cooling liquid may be maintained nearly constant. Therefore, the light modulation device and thus the projector may be stably operated.

An operation control method according to a second aspect of the invention is an operation control method of a projector including a light source, a light modulation device configured to modulate a light emitted from the light source, a casing containing at least a part of the light modulation device and having an interior filled with a cooling liquid, and a circulating device configured to circulate the cooling liquid at least to a light exiting side of a modulation part in the light modulation device, and the method includes changing an operation level of the circulating device.

According to the second aspect of the invention, the projector having the above described configuration performs the operation control method, and thereby, the same advantages as those of the projector according to the first aspect may be offered.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
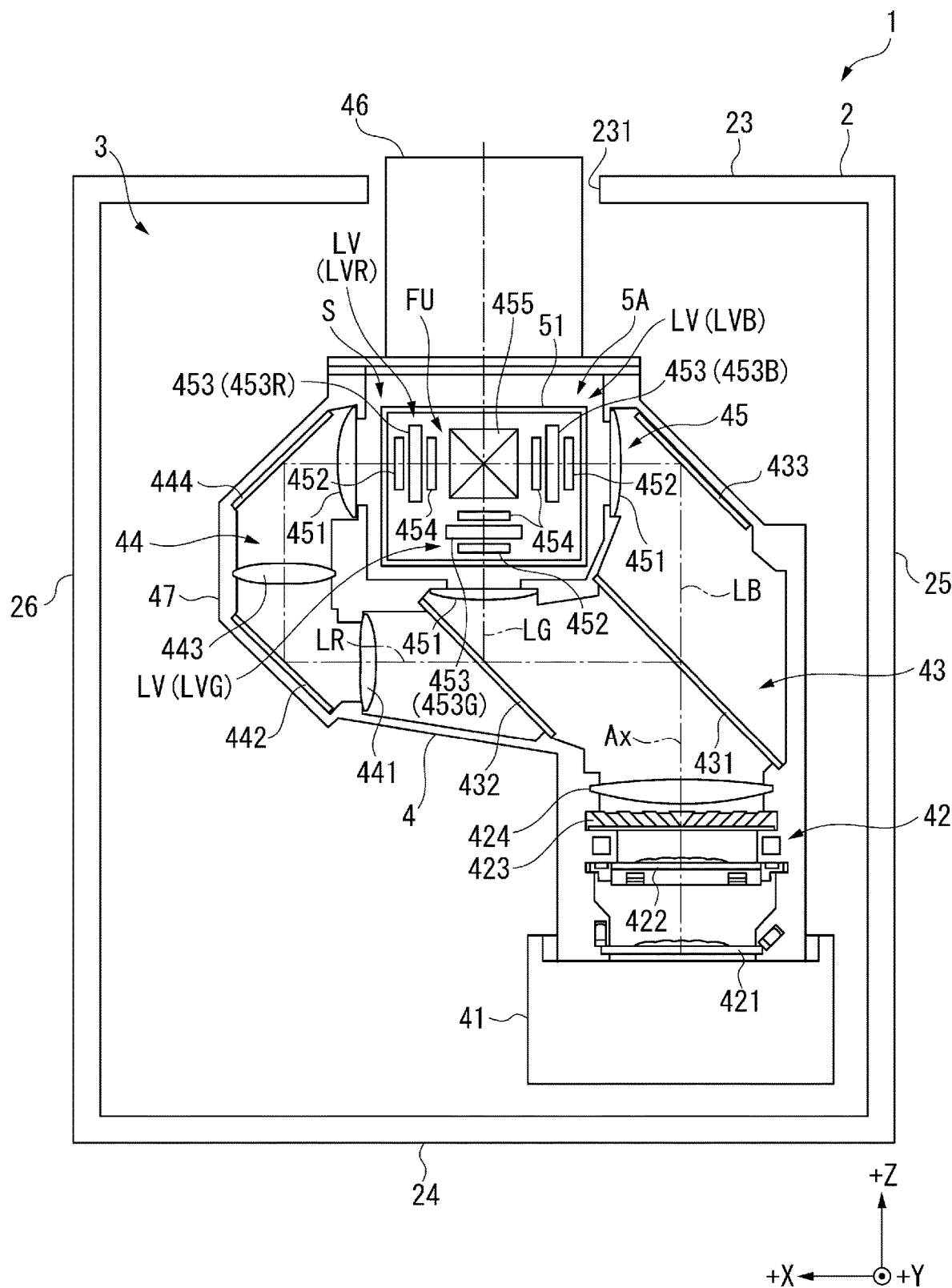
FIG. 1 is a schematic diagram showing a configuration of a projector according to a first embodiment of the invention.

As below, the first embodiment of the invention will be explained with reference to the drawings.
Schematic Configuration of Projector FIG. 1 is a schematic diagram showing a configuration of a projector 1 according to the embodiment.

The projector 1 according to the embodiment is a projection-type display apparatus that modulates a light output from a light source 41 provided inside and forms an image according to image information and enlarges and projects the image on a projection surface such as a screen. As shown in FIG. 1, the projector 1 includes an exterior housing 2 forming an appearance, and an apparatus main body 3 housed within the exterior housing 2.

The projector 1 has one of features in a configuration of a cooling device 5A, which will be described later in detail.

As below, the configuration of the projector 1 will be described in detail.

Configuration of Exterior Housing

The exterior housing 2 is formed in a nearly rectangular parallelepiped shape. The exterior housing 2 has a front surface part 23, a rear surface part 24, a left side surface part 25, and a right side surface part 26, and further has a top surface part connecting one sides of these surface parts and a bottom surface part connecting the other sides of these surface parts (not shown). Note that the bottom surface part is a surface facing the installation surface of the projector 1 and a plurality of leg portions are provided thereon.

The front surface part 23 has an opening portion 231. A part of a projection optical device 46, which will be described later, is exposed via the opening portion 231, and an image is projected by the projection optical device 46.

Configuration of Apparatus Main Body

Figure 3:
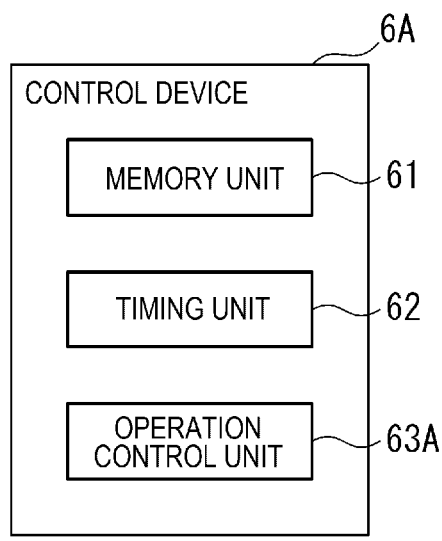
FIG. 3 is a block diagram showing a configuration of a control device in the first embodiment.

The apparatus main body 3 includes an image projection device 4, the cooling device 5A, and a control device 6A (see FIG. 3). Further, the apparatus main body 3 includes a power source device that supplies electric power to electronic components forming the projector 1.

Configuration of Image Projection Device

The image projection device 4 projects an image light formed according to image information (including image signals) input from the control device on the projection surface and displays an image according to the image light. The image projection device 4 includes the light source 41, a homogenization device 42, a color separation device 43, a relay device 44, an image formation device 45, the projection optical device 46, and an optical component casing 47.

The light source 41 outputs an illumination light to the homogenization device 42. As a configuration of the light source 41, e.g. a configuration having a solid-state light source such as an LD (Laser Diode) that outputs blue light as excitation light, and a wavelength conversion element that wavelength-converts a part of the blue light output from the solid-state light source into fluorescent light containing green light and red light may be exemplified. Note that, as another configuration of the light source 41, a configuration having a light source lamp such as an ultrahigh pressure mercury lamp as a light source or a configuration having another solid-state light source such as an LED (Light Emitting Diode) may be exemplified.

The homogenization device 42 homogenizes the illuminance within an orthogonal plane to the center axis of the luminous fluxes entering from the light source 41. The homogenization device 42 includes a first lens array 421, a second lens array 422, a polarization conversion element 423, and a superimposing lens 424. Note that the homogenization device 42 may further include a dimmer that shields a part of the incident luminous fluxes passing through the homogenization device 42 and adjusts the amount of transmitted light.

Of the elements, the polarization conversion element 423 converts and outputs the luminous fluxes entering from the second lens array 422 into one type of linearly-polarized lights.

The color separation device 43 separates the luminous fluxes entering from the homogenization device 42 into red light LR, green light LG, and blue light BL. The color separation device 43 includes a dichroic mirror 431 that reflects the red light LR and the green light LG and transmits the blue light BL, a dichroic mirror 432 that transmits the red light LR and reflects the green light LG, and a reflection mirror 433 that reflects the separated blue light BL toward a blue field lens 451. Note that the green light LG reflected by the dichroic mirror 432 is entered into a green field lens 451.

The relay device 44 includes a light incident-side lens 441, a reflection mirror 442, a relay lens 443, and a reflection mirror 444 respectively provided in the optical path of the separated red light LR, and guides the red light LR to a red field lens 451. Note that, in the embodiment, the image projection device 4 has the configuration in which the red light LR passes through the relay device 44, however, may have a configuration in which e.g. the blue light LB passes through the device.

The image formation device 45 modulates the entering color lights with respect to each color light and combines the modulated respective color lights, and thereby, forms an image according to the image information. The image formation device 45 includes the field lenses 451, light incident-side polarizers 452, liquid crystal panels 453, and light exiting-side polarizers 454 provided for the three color lights LR, LG, LB and a single light combining device 456.

The light incident-side polarizers 452 and light exiting-side polarizers 454 are wire grid-type inorganic polarizers. However, not limited to those, polarizers employed as the polarizers 452, 454 may be other polarizers.

The liquid crystal panels 453 modulate the lights output from the light source 41 according to image information. The liquid crystal panels 453 include the liquid crystal panel 453R corresponding to the red light LR, the liquid crystal panel 453G corresponding to the green light LG, and the liquid crystal panel 453B corresponding to the blue light LB. For the liquid crystal panels 453, in the embodiment, transmissive liquid crystal panels having different light incident surfaces and light exiting surfaces are employed.

A light modulation device LV includes the liquid crystal panel 453, and the light incident-side polarizer 452 and the light exiting-side polarizer 454 located in positions with the liquid crystal panel 453 in between on the light incident side and the light exiting side. The light modulation devices LV include the light modulation device LVR corresponding to the red light LR, the modulation device LVG corresponding to the green light LG, and the modulation device LVB corresponding to the blue light LB. In the embodiment, the modulation part in the light modulation device LV refers to a modulation part (a part in which liquid crystal molecules are enclosed) in the liquid crystal panel 453. Note that the modulation part is located inside of the liquid crystal panel 453, and the modulation part in the light modulation device LV may be regarded as a light exiting surface in the liquid crystal panel 453.

The light combining device 455 combines the respective color lights modulated by the liquid crystal panels 453 and passing through the light exiting-side polarizers 454. In the embodiment, the light combining device 455 includes a cross dichroic prism in a nearly rectangular parallelepiped shape, and has three light incident surfaces 456B, 456G, 456R (see FIG. 2) into which the color lights modulated by the respective liquid crystal panels 453 are entered, and a single light exiting surface 455E (see FIG. 2) that outputs an image light forming an image by combination of the color lights. The image light output from the light exiting surface 455E is entered into the projection optical device 46.

The three liquid crystal panels 453 and the three light exiting-side polarizers 454 forming the image formation device 45 are held by holding members (not shown) on corresponding light incident surfaces 455B, 455G, 455R in the light combining device 455 and integrated.

Note that, in the following explanation, the light incident-side polarizers 452, the liquid crystal panels 453, the light exiting-side polarizers 454, and the light combining device 455 are referred to as "image formation unit FU". The image formation unit FU is placed within a casing 51 of the cooling device 5A, which will be described later.

The projection optical device 46 enlarges and projects the image light entering from the light combining device 455 on the projection surface to display the image formed by the image light on the projection surface. That is, the projection optical device 46 projects the lights modulated by the light modulation devices LVR, LVG, LVB. The projection optical device 46 is formed as a set lens including a plurality of lenses placed within a lens tube.

Of the elements, the plurality of lenses include a focus lens that adjusts the focus of the projected image light, and the focus lens is held in the lens tube movably along the center axis of the lens tube. A user adjusts the position of the focus lens, and thereby, may manually adjust the focus of the image light.

The optical component casing 47 holds the above described devices 42 to 44 and the field lenses 451.

Here, in the image projection device 4, an illumination light axis Ax as an optical axis in design is set, and the optical component casing 47 holds the devices 42 to 44 and the field lenses 451 in predetermined positions on the illumination light axis Ax. In the optical component casing 47, a space S in which the image formation unit FU and the casing 51 of the cooling device 5A are placed is formed in a position surrounded on three sides by the respective field lenses 451.

Further, the light source 41 and the projection optical device 46 are placed in predetermined positions on the illumination light axis Ax.

In the following explanation, a direction from the rear surface part 24 toward the front surface part 23 is referred to as "+Z-direction", and directions crossing the +Z-direction and crossing each other are referred to as "+X-direction" and "+Y-direction". Of these +X-direction and +Y-direction, the +X-direction is a direction from the left side surface part 25 toward the right side surface part 26, and the +Y-direction is a direction from the bottom surface part toward the top surface part. That is, the +Z-direction is a direction in which the projection optical device 46 projects the image light along the center axis of the projection optical device 46 as seen from the +Y-direction side. Further, the opposite direction to the +Z-direction is referred to as "−Z-direction" (not shown). The same applies to "−X-direction" and "−Y-direction". Note that, in the embodiment, the +X-direction, the +Y-direction, and the +Z-direction are defined as directions orthogonal to one another.

Configuration of Cooling Device

Figure 2:
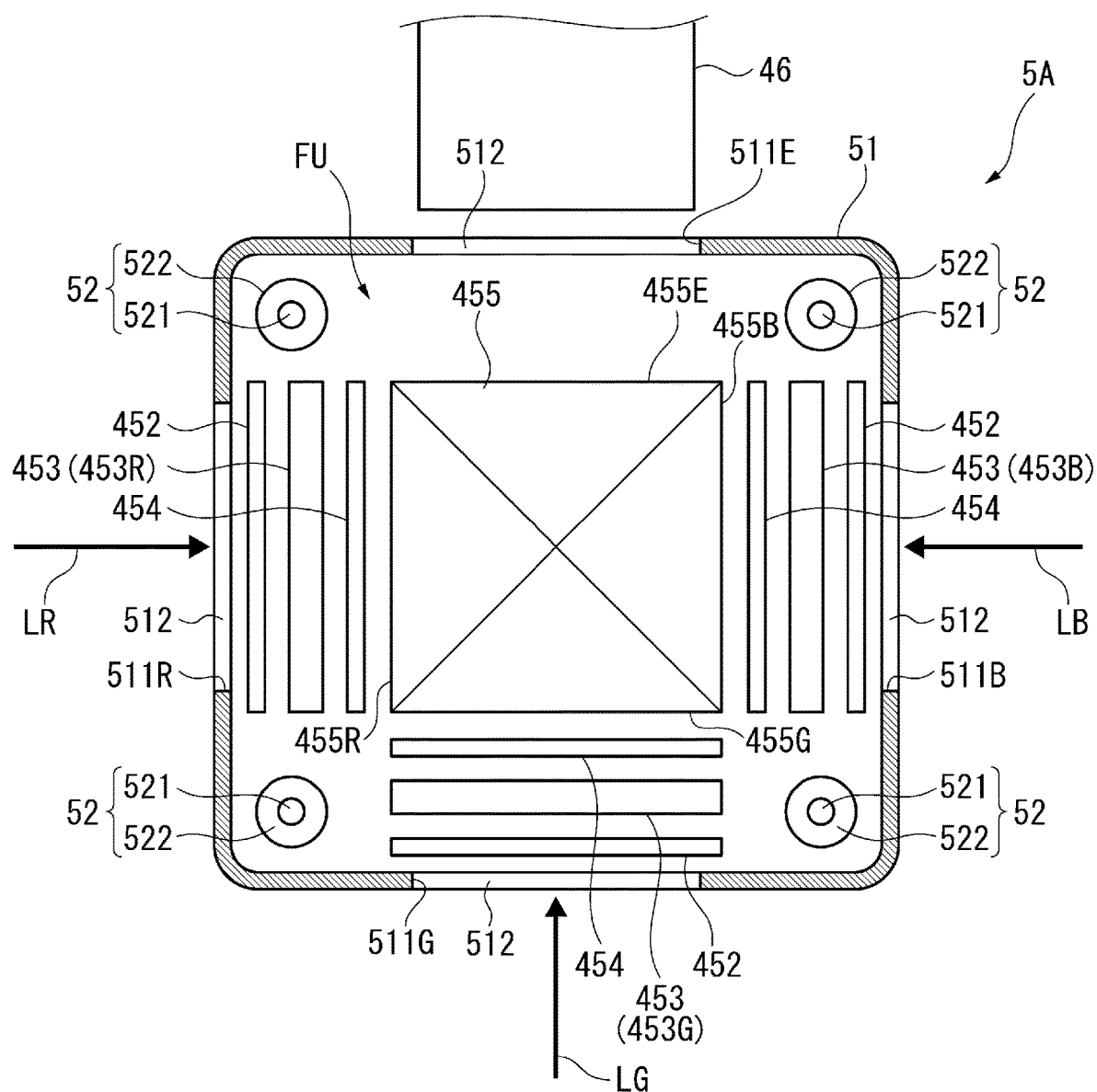
FIG. 2 is a schematic diagram showing a configuration of a cooling device in the first embodiment.

FIG. 2 is a schematic diagram showing a configuration of the cooling device 5A and schematically showing a section of the cooling device 5A along the XZ-plane.

The cooling device 5A cools the image formation unit FU as one of the objects to be cooled by the projector 1. The cooling device 5A has the casing 51 placed within the space as shown in FIGS. 1 and 2, and further has circulating devices 52 as shown in FIG. 2.

Configuration of Casing

As shown in FIG. 2, the casing 51 is a casing in which the image formation unit FU is placed and formed in a nearly rectangular parallelepiped shape. That is, the casing 51 contains the light modulation devices LV including the liquid crystal panels 453, and the light incident-side polarizers 452 and the light exiting-side polarizers 454, and the light combining device 455. The casing 51 has opening portions 511B, 511G, 511R, 511E in the respective different side surface parts.

The opening portions 511B, 511G, 511R are formed in positions facing the respective corresponding light incident-side polarizers 452. These opening portions 511B, 511G, 511R are opening portions through which the blue light LB, the green light LG, and the red light LR transmitted through the respective corresponding field lenses 451 (see FIG. 1) pass.

The opening portion 511E is formed in a position facing the light exiting surface 455E of the light combining device 455. The opening portion 511E is an opening portion through which the image light output from the light exiting surface 455E passes.

Light-transmissive members 512 are fitted in the opening portions 511B, 511G, 511R, 511E and the opening portions 511B, 511G, 511R, 511E are closed by the light-transmissive members 512. Note that the light-transmissive members 512 may close the corresponding opening portions from inside of the casing 51 or from outside of the casing 51.

The casing 51 is formed as a sealed casing in which a cooling liquid is enclosed. That is, the interior of the casing 51 is filled with the cooling liquid and the image formation unit FU is immersed in the cooling liquid.

Note that the sealed casing includes a simple closed structure as long as leaking of the cooling liquid within the casing 51 out of the casing 51 is suppressed, e.g. a structure in which a part of the side surface part of the casing 51 is detachably attached via a packing or the like.

As the cooling liquid, an inert liquid that does not affect the operation of the liquid crystal panels 453 to be supplied and driven with power and image information (specifically, a fluorine-based inert liquid) may be used. As the inert liquid, e.g. Fluorinert (Trademark of 3M) and NOVEC (Trademark of 3M) may be employed.

Configuration of Circulating Device

The operation of the circulating devices 52 is controlled by the control device 6A, which will be described later. The circulating devices 52 stir the cooling liquid within the casing 51 and circulates the cooling liquid inside of the casing 51. Thereby, the circulating devices 52 circulate the cooling liquid in the image formation unit FU.

In the embodiment, the circulating device 52 has a motor (not shown), a shaft 521 rotated by the motor, and an impeller 522 provided on the outer circumference of the shaft 521. According to the configuration, the shaft 521 and the impeller 522 that stir the cooling liquid can be placed inside of the casing 51 and the motor as a heat generation source can be placed outside of the casing 51. In this case, the temperature rise of the cooling liquid by the circulating devices 52 may be suppressed. However, the configuration of the circulating device 52 is not limited to that described as above.

In the embodiment, pluralities of the shafts 521 and the impellers 522 are provided in dead spaces within the casing 51. Specifically, the respective shafts 521 and impellers 522 are placed in four corner parts when the interior of the casing 51 is seen from the +Y-direction side, through which little image light entering the projection optical device 46 passes in the nearly square casing 51.

That is, the shafts 521 and the impellers 522 of the two circulating devices 52 of the four circulating devices 52 are placed in positions with the liquid crystal panel 453B in between in the +Z-direction, and the shafts 521 and the impellers 522 of the other two circulating devices 52 are placed in positions with the liquid crystal panel 453R in between in the +Z-direction. In other words, the shafts 521 and the impellers 522 of the two circulating devices 52 of the four circulating devices 52 are placed in positions with the liquid crystal panel 453G in between in the +X-direction, and the shafts 521 and the impellers 522 of the other two circulating devices 52 are placed in positions with the light exiting surface 455E of the light combining device 455 in between in the +X-direction. Note that the positions and the number of the circulating devices 52 are not limited, but may be appropriately changed.

Flow of Cooling Liquid

In the cooling device 5A, when the circulating devices 52 are driven, as shown in FIG. 2, the cooling liquid within the casing 51 circulates along between the inner surface of the casing 51 and the light incident-side polarizers 452, between the light incident-side polarizers 452 and the liquid crystal panels 453, between the liquid crystal panels 453 and the light exiting-side polarizers 454, and between the light exiting-side polarizers 454 and the light combining device 455. Thereby, the light incident-side polarizers 452, the liquid crystal panels 453, and the light exiting-side polarizers 454 are cooled.

That is, inside of the casing 51, flow channels in which the cooling liquid can circulate are respectively formed between the liquid crystal panels 453 and the light exiting-side polarizers 454, between the light exiting-side polarizers 454 and the light exiting surfaces 455B, 455G, 455R of the light combining device 455, and between the light exiting surface 455E of the light combining device 455 and the light-transmissive member 512 closing the opening portion 511E at the downstream of the optical paths of the color lights for the respective liquid crystal panels 453B, 453G, 453R.

Note that the flow rates of the cooling liquid respectively circulating along the light incident-side polarizers 452, the liquid crystal panels 453, and the light exiting-side polarizers 454 by the operation of the circulating device 52 are nearly the same. That is, the flow rates of the cooling liquid circulating along the respective light incident-side polarizers 452 are nearly the same and the flow rates of the cooling liquid circulating along the respective liquid crystal panels 453 are nearly the same. Similarly, the flow rates of the cooling liquid circulating along the respective light exiting-side polarizers 454 are nearly the same. Accordingly, the respective light incident-side polarizers 452, liquid crystal panels 453, and light exiting-side polarizers 454 are cooled with nearly the same cooling efficiency. However, the flow rates are not limited to those, but e.g. the flow rates of the cooling liquid circulating in the configuration having a temperature that tends to be higher and the configuration that tends to be deteriorated by heat may be made higher than those of the other configurations.

Cause of Out-of-Focus Condition Produced in Projected Image

As described above, the image formation unit FU is immersed in the cooling liquid within the casing 51. Then, the cooling liquid is stirred by the operation of the circulating devices 52 provided in the casing 51, and circulated within the casing 51.

The density of the cooling liquid changes depending on the temperature and the refractive index also changes. For example, the fluorine-based inert liquid has a property that the refractive index is lower as the temperature is higher.

Here, it is considered that, at the start of use of the projector 1, not only the temperature of the image formation unit FU but also the temperature of the cooling liquid is lower. That is, at the start of use of the projector 1, the temperature of the cooling liquid is lower and the refractive index of the cooling liquid is higher. On the other hand, with continuous use of the projector 1, the temperatures of the liquid crystal panels 453 and the polarizers 452, 454 rise, and the temperature of the cooling liquid becomes higher for cooling the liquid crystal panels 453 and the polarizers 452, 454 and the refractive index of the cooling liquid becomes lower.

Accordingly, in the case where the user adjusts the focus of the projected image by operating the focus lens at the time closer to the start of use of the projector 1, i.e., the time when the refractive index of the cooling liquid is higher, if the temperature of the cooling liquid is higher with time, the refractive index of the cooling liquid becomes lower and the projected image becomes out of focus.

On the other hand, in the projector 1 of the embodiment, the control device 6A controls the operation of the circulating devices 52 and quickly raises the temperature of the cooling liquid from the start of user of the projector 1, and thereby, the amount of temperature change of the cooling liquid with time is reduced and the refractive index change of the cooling liquid with time is reduced. Thereby, production of the focus shift of the projected image is suppressed.

The control device 6A that performs the above described control will be explained as below.

Configuration of Control Device

FIG. 3 is a block diagram showing a configuration of the control device 6A.

The control device 6A has an arithmetic processing circuit such as a CPU (Central Processing Unit) and controls the entire operation of the projector 1. For example, the control device 6A activates the projector 1 in response to the power-on operation by the user. Then, the control device 6A controls lighting of the light source 41, and further, processes externally input image information and outputs image signals according to the processed image information to the liquid crystal panels 453.

In addition, as shown in FIG. 3, the control device 6A has a memory unit 61, a timing unit 62, and an operation control unit 63A.

The memory unit 61 stores programs and data necessary for the operation control of the projector 1 by the control device 6A. Further, the control device 6A executes operation control processing of timing an elapsed time after the projector 1 is turned on and allowing the circulating devices 52 of the cooling device 5A to operate according to the elapsed time by the timing unit 62 and the operation control unit 63A based on the operation control programs and data stored in the memory unit 61. That is, the control device 6A performs operation control processing including an operation control method according to the invention.

In the embodiment, the control device 6A can execute low-level control and high-level control in the operation control processing.

The low-level control is a control mode of setting the operation level of the circulating devices 52 to a first operation level as a low level. That is, in the low-level control, the control device 6A controls the operation of the circulating devices 52 at the first operation level. The low-level control corresponds to first control.

The high-level control is a control mode of setting the operation level of the circulating devices 52 to a second operation level as a high level. That is, in the high-level control, the control device 6A controls the operation of the circulating devices 52 at the second operation level. The high-level control corresponds to second control.

Here, the operation level refers to e.g. the degree of the operating condition of the circulating devices 52 based on voltages applied to the motors of the circulating devices 52. In other words, the operation level refers to the velocity of the cooling liquid circulating along the objects to be cooled by the circulating devices 52. Further, the second operation level refers to an operation level of the circulating devices 52 at which the velocity of the cooling liquid circulating along the objects to be cooled is higher than the velocity at the first operation level. Specifically, the second operation level is the operation level at which the velocity of the cooling liquid circulating on the light exiting sides of the modulation parts of the liquid crystal panels 453 is higher than the velocity at the first operation level.

Figure 4:
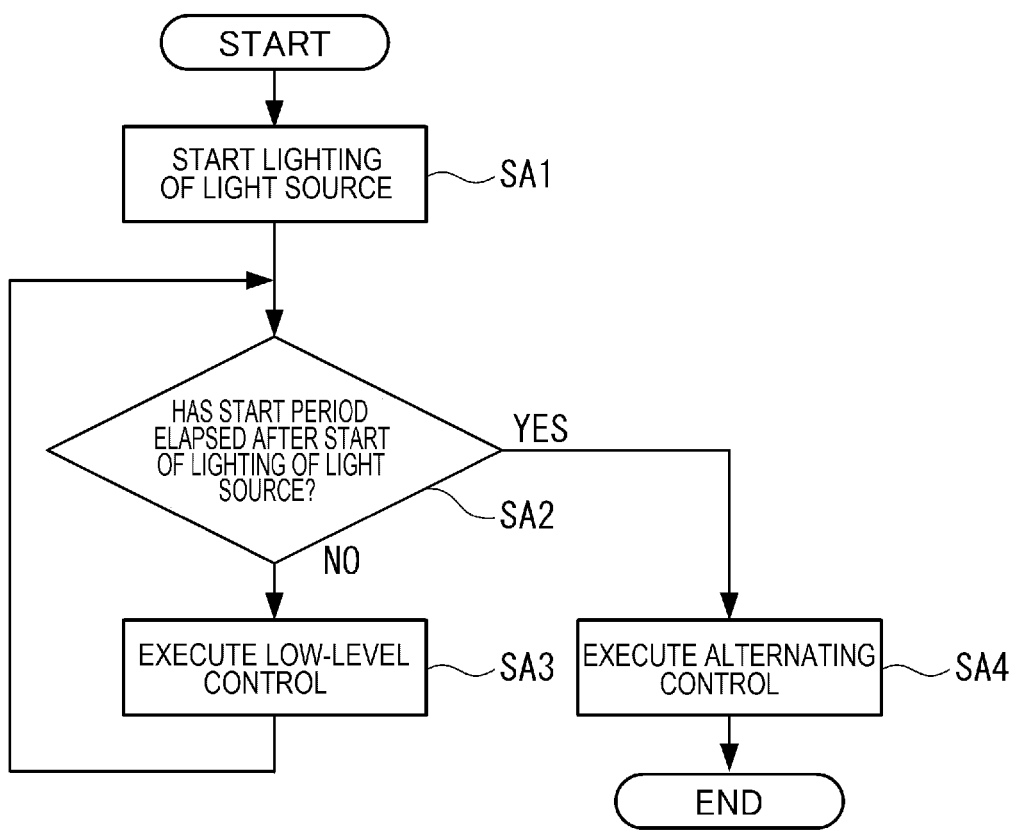
FIG. 4 is a flowchart showing operation control processing in the first embodiment.

FIG. 4 is a flowchart showing the operation control processing of the circulating devices 52 by the control device 6A.

The operation control processing to be executed by the control device 6A is executed, for example, when the projector 1 is turned on. In the operation control processing, as shown in FIG. 4, first, the control device 6A starts lighting of the light source 41 in response to the power-on operation of the projector 1 by the user (step SA1). Concurrently, the timing unit 62 times an elapsed time after the start of lighting of the light source 41.

The operation control unit 63A controls the operation of the circulating devices 52.

Specifically, the operation control unit 63A determines whether or not a start period as a predetermined period stored in the memory unit 61 has elapsed based on the timed time (elapsed time) timed by the timing unit 62. That is, the operation control unit 63A determines whether or not a predetermined time has elapsed after the start of lighting of the light source 41 (step SA2). Here, the predetermined time shows the length of the start period (predetermined period).

Then, if the operation control unit 63A determines that the predetermined time has not elapsed after the start of lighting of the light source 41 (step SA2: NO), the operation control unit 63A executes the low-level control of controlling the operation of the circulating devices 52 at the low level (first operation level) (step SA3). That is, the operation control unit 63A executes the low-level control in the start period (predetermined period) until the predetermined time elapses after the start of lighting of the light source 41. In the embodiment, the operation control unit 63A of the control device 6A stops the operation of the circulating devices 52 in the low-level control executed in the start period (predetermined period). Then, the operation control unit 63A returns the processing to step SA2.

On the other hand, if the operation control unit 63A determines that the predetermined time has elapsed after the start of lighting of the light source 41 (step SA2: YES), the operation control unit 63A executes alternating control of alternately repeating the high-level control and the low-level control (step SA4). In the alternating control, the operation level of the circulating devices 52 is alternately switched between the second operation level as the high level and the first operation level as the low level by the operation control unit 63A, and the operation of the circulating devices 52 is controlled according to the switched operation level.

In this manner, the operation control unit 63A of the control device 6A changes the operation level of the circulating devices 52. In the embodiment, the operation control unit 63A changes the operation level of the circulating devices 52 based on the elapsed time after the start of lighting of the light source 41.

Note that the period in which the alternating control is executed at step SA4 is referred to as "alternating control period". The alternating control period includes a high-level control period (second control period) as a period in which the operation control unit 63A controls the operation of the circulating devices 52 at the second operation level at step SA4 and a low-level control period (first control period) in which the operation control unit 63A controls the operation of the circulating devices 52 at the first operation level at step SA4. The alternating control period is continued during the time when the projector 1 is ON.

The first operation level and the second operation level, and the length of the high-level control period and the length of the low-level control period are stored in the memory unit 61.

Accordingly, in the alternating control period, the cycle of switching between the high-level control period in which the operation level of the circulating devices 52 is the second operation level and the low-level control period in which the operation level of the circulating devices 52 is the first operation level may be set as appropriate. However, it is preferable that the switching cycle is a cycle in which the temperature of the cooling liquid for cooling the image formation unit FU may be maintained within a preset constant temperature range. Note that the high-level control period and the low-level control period may have the same length or one of the high-level control period and the low-level control period may be longer than the other.

For example, the above described start period may be set to a period until the temperature of the cooling liquid rising from the start of lighting of the light source 41 reaches the temperature range by execution of the low-level control. The temperature rise rate of the cooling liquid can be calculated by experiments or the like, and the start period can be calculated similarly based on the temperature rise rate, the size of the liquid crystal panels 453, etc. Note that, as a target temperature within the temperature range, the temperature of the cooling liquid at which the light modulation devices LV including the liquid crystal panels 453 can stably operate may be exemplified. Further, as the predetermined temperature range, a temperature range having a width of about 10° C. including the target temperature may be exemplified, but can be changed as appropriate.

Furthermore, the operation state of the circulating devices 52 at the second operation level as the high level may be an operation state in which the flow rate of the cooling liquid circulated by the circulating devices 52 is larger than that in the operation state of the circulating devices 52 at the first operation level as the low level. On the other hand, the operation state of the circulating devices 52 at the first operation level includes stoppage of the operation of the circulating devices 52. In the embodiment, the low-level control performed by the operation control unit 63A is to stop the circulating devices 52 as described above.

Figure 5:
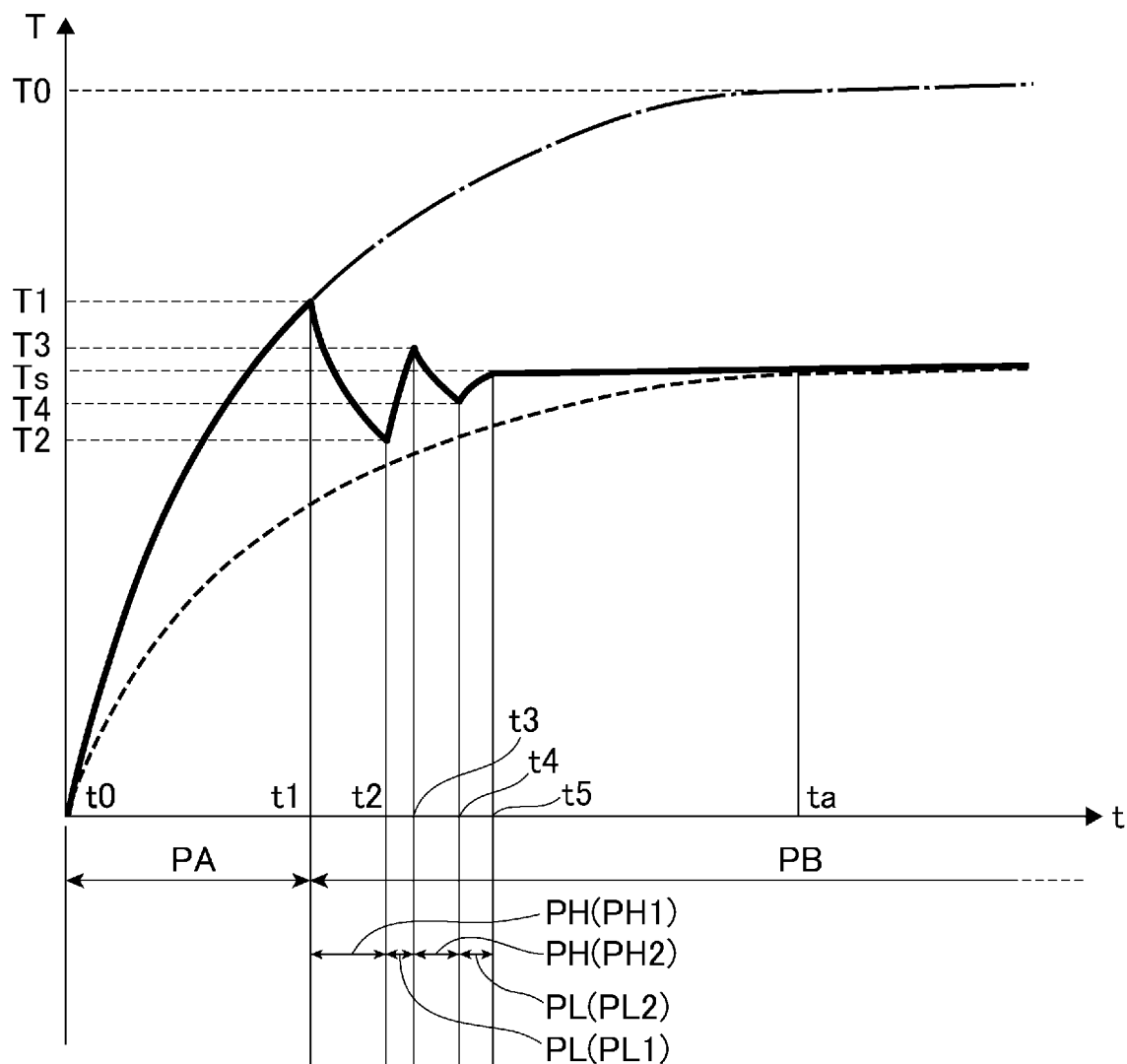
FIG. 5 is a graph showing an example of changes of a temperature of a cooling liquid and an example of changes of a voltage applied to circulating devices in the first embodiment.
Figure 5:
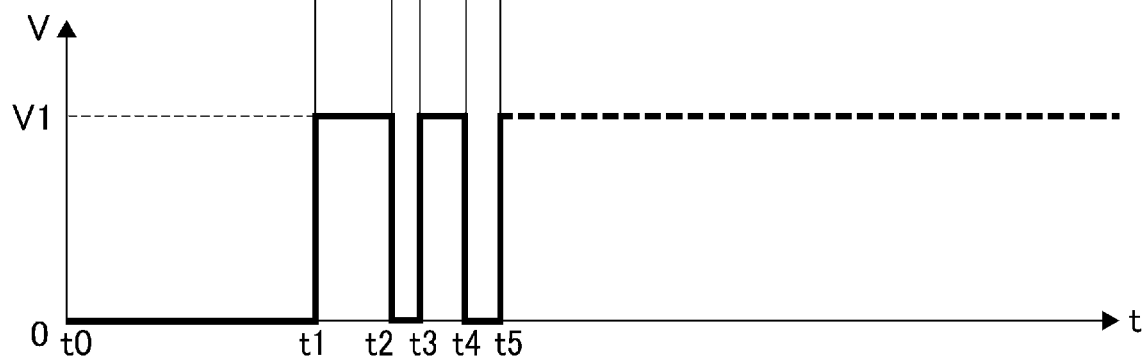

FIG. 5 is a graph showing an example of changes of temperature T of the cooling liquid from the start of lighting of the light source 41 and an example of changes of a voltage applied to the circulating devices 52 from the start of lighting of the light source 41. Specifically, the upper part of FIG. 5 shows the temperature change graph showing the example of changes of the temperature T of the cooling liquid from the start of lighting of the light source 41. The vertical axis of the temperature change graph indicates the temperature T of the cooling liquid and the horizontal axis of the temperature change graph indicates time t. Further, the lower upper part of FIG. 5 shows the voltage change graph showing the example of changes of the voltage applied to the motors of the circulating devices 52 from the start of lighting of the light source 41. The vertical axis of the voltage change graph indicates voltage V applied to the motors of the circulating devices 52 and the horizontal axis of the voltage change graph indicates time t.

First, in the temperature change graph shown in the upper part of FIG. 5, time t0 shows the time of the start of lighting of the light source 41 e.g. the time when the power of the projector 1 is switched from OFF to ON by the user. The temperature T of the cooling liquid at the time t0 is a predetermined temperature depending on the temperature in the environment in which the projector 1 is installed. Further, in the voltage change graph shown in the upper part of FIG. 5, the voltage V at the time t0 is 0 V. In the embodiment, the time t0 indicates 0 seconds.

Here, when the light source 41 is lighted, the luminous flux output from the light source 41 passes through the cooling liquid and luminous flux is entered into the optical components immersed in the cooling liquid and heat is generated, and accordingly, the temperature of the cooling liquid gradually rises.

On the other hand, as shown by a dotted line in the temperature change graph in the upper part of FIG. 5, when the operation level of the circulating devices 52 from the start of lighting of the light source 41 is the high level, the temperature T of the cooling liquid rises at a predetermined temperature rise rate, reaches a target temperature Ts included in the temperature range at time ta, and then, is maintained at a temperature within the temperature range. In this case, the image formation unit FU may be sufficiently cooled.

However, the temperature rise rate during the time when the operation level of the circulating devices 52 is the high level is smaller, and the time until the temperature T of the cooling liquid reaches e.g. the target temperature Ts is longer. In other words, the time ta is taken until the temperature T of the cooling liquid reaches the target temperature Ts from the start of lighting of the light source 41. Accordingly, the focus adjustment of the projected image is performed at the time closer to the start of lighting of the light source 41, the temperature difference between the temperature T of the cooling liquid and the target temperature Ts at the time is larger and the difference between the refractive indexes of the cooling liquid is larger, and thus, the focus shift is produced with the time after the start of lighting of the light source 41.

On the other hand, as shown by a dashed-dotted line in the part of FIG. 5, when the operation level of the circulating devices 52 from the start of lighting of the light source 41 is the first operation level, that is, when the circulating devices 52 are stopped, the temperature T of the cooling liquid rises at a higher temperature rise rate than the temperature rise rate when the operation level of the circulating devices 52 is the second operation level. Then, at a time after a certain time elapses from the start of lighting of the light source 41, the temperature T of the cooling liquid reaches temperature T0 above the predetermined temperature range.

The temperature rise rate during the time when the operation level of the circulating devices 52 is the first operation level is higher, and accordingly, when the operation level of the circulating devices 52 from the start of lighting of the light source 41 is the first operation level lower than the second operation level, the temperature T of the cooling liquid may reach the target temperature Ts in a shorter time. However, if the operation level of the circulating devices 52 remains the first operation level from the start of lighting of the light source 41, after the certain time, the temperature T of the cooling liquid is maintained at the temperature T0 above the temperature range. Then, the focus adjustment of the projected image is performed at the time closer to the start of lighting of the light source 41, like the above described case, the temperature difference between the temperature T of the cooling liquid and the temperature T0 at the time is larger and the difference between the refractive indexes of the cooling liquid is larger, and thus, the focus shift is produced with the time after the start of lighting of the light source 41. Furthermore, in this case, the temperature T of the cooling liquid is higher, and it may be impossible to sufficiently cool the image formation unit FU.

On the other hand, the operation control unit 63A executes the low-level control of controlling the operation of the circulating devices 52 at the first operation level as the low level during a start period PA after the start of lighting of the light source 41 before time t1 elapses.

In the embodiment, the low-level control in the start period PA is to stop the circulating devices 52 as described above. That is, as shown by the voltage change graph in the lower part of FIG. 5, the voltage applied to the circulating devices 52 in the low-level control executed in the start period PA is 0 V. Thereby, as shown by a solid line in the temperature change graph in the upper part of FIG. 5, in the start period PA, the temperature T of the cooling liquid quickly rises. Accordingly, the temperature T of the cooling liquid becomes temperature T1 higher than the target temperature Ts at the time t1.

Then, when the start period PA elapses, that is, the time t1 elapses from the start of lighting of the light source 41, the operation control unit 63A executes the alternating control of alternately repeating the high-level control of controlling the operation of the circulating devices 52 at the second operation level as the high level and the low-level control of controlling the operation of the circulating devices 52 at the first operation level as the low level, and maintains the temperature T of the cooling liquid within the temperature range including the target temperature Ts. That is, the period after the lapse of the start period PA is an alternating control period PB for alternately repeating a high-level control period PH in which the operation of the circulating devices 52 is controlled at the second operation level and a low-level control period PL in which the operation of the circulating devices 52 is controlled at the first operation level.

Specifically, when the start period PA elapses and the alternating control period PB begins, the operation control unit 63A executes the high-level control of controlling the operation of the circulating devices 52 at the second operation level as the high level during a high-level control period PH1 set after the start period PA. That is, the high-level control period PH1 is provided in the initial part of the alternating control period PB, and the operation control unit 63A sets the operation level of the circulating devices 52 to the second operation level during the high-level control period PH1 from the time t1 to time t2 longer than the time t1. In other words, when the time shifts from the start period PA to the alternating control period PB, the operation control unit 63A switches from the low-level control of controlling the operation of the circulating devices 52 at the first operation level as the low level to the high-level control of controlling the operation of the circulating devices 52 at the second operation level as the high level. In the embodiment, the voltage applied to the circulating devices 52 in the high-level control executed in the high-level control period PH1 is voltage V1 larger than 0 V. Thereby, the temperature T of the cooling liquid reaches temperature T2 lower than the temperature T1 and lower than the target temperature Ts at the time t2 from the temperature T1 reached when the start period PA elapses at the time t1. Note that the high-level control period PH1 is shorter than the start period PA.

When the high-level control period PH1 elapses, the operation control unit 63A executes the low-level control of controlling the operation of the circulating devices 52 at the first operation level as the low level during a low-level control period PL1 set after the high-level control period PH1. That is, the operation control unit 63A sets the operation level of the circulating devices 52 to the first operation level during the low-level control period PL1 from the time t2 to time t3 longer than the time t2. In the embodiment, the voltage applied to the circulating devices 52 in the low-level control executed in the low-level control period PL1 is 0 V. Thereby, the temperature T of the cooling liquid reaches temperature T3 lower than the time T1 and higher than the target temperature Ts at the time t3 from the temperature T2 reached when the high-level control period PH1 elapses at the time t2. Note that the period PL1 is shorter than the period PH1.

When the low-level control period PL1 elapses, the operation control unit 63A executes the high-level control of controlling the operation of the circulating devices 52 at the second operation level as the high level during a high-level control period PH2 set after the low-level control period PL1. That is, the operation control unit 63A sets the operation level of the circulating devices 52 to the second operation level during the high-level control period PH2 from the time t3 to time t4 longer than the time t3. In the embodiment, the voltage applied to the circulating devices 52 in the high-level control executed in the high-level control period PH2 is the voltage V1. Thereby, the temperature T of the cooling liquid reaches temperature T4 higher than the temperature T2 and lower than the target temperature Ts at the time t4 from the temperature T3 reached when the low-level control period PL1 elapses at the time t3. Note that the period PH2 is shorter than the period PL1.

When the high-level control period PH2 elapses, the operation control unit 63A executes the low-level control of controlling the operation of the circulating devices 52 at the first operation level as the low level during a low-level control period PL2 set after the high-level control period PH2. That is, the operation control unit 63A sets the operation level of the circulating devices 52 to the first operation level during the low-level control period PL2 from the time t4 to time t5 longer than the time t4. In the embodiment, the voltage applied to the circulating devices 52 in the low-level control executed in the low-level control period PL2 is 0 V. Thereby, the temperature T of the cooling liquid reaches a temperature nearly equal to the target temperature Ts at the time t5 from the temperature T4 reached when the high-level control period PH2 elapses at the time t4. Note that the period PL2 is shorter than the period PH2.

Though the detailed illustration is omitted in FIG. 5, after the low-level control period PL2, the operation control unit 63A subsequently alternately switches between the high-level control and the low-level control in the predetermined cycle. That is, in the temperature change graph shown in the upper part of FIG. 5, after the low-level control period PL2, also, the high-level control period PH and the low-level control period PL are alternately repeated in the predetermined cycle. Accordingly, as shown by a thick dotted line in the voltage change graph in the lower part of FIG. 5, the voltage applied to the circulating devices 52 after the low-level control period PL2 is alternately switched between the voltages V1 and 0 V. Note that the respective lengths of the high-level control period PH and the low-level control period PL repeated after the low-level control period PL2 are shorter than the length of the low-level control period PL2.

According to the configuration, even in the case where the focus adjustment of the projected image is performed at the time closer to the start of lighting of the light source 41, the difference between the temperature of the cooling liquid and the target temperature Ts at the time is smaller and the difference between the refractive indexes of the cooling liquid is larger. Therefore, if a time elapses from the start of lighting of the light source 41, production of a focus shift of the projected image may be suppressed. Further, in this case, the temperature of the cooling liquid is kept within the temperature range including the target temperature Ts, and thus, the image formation unit FU may be sufficiently cooled.

Advantages of First Embodiment

According to the projector 1 of the above described embodiment, the following advantages may be offered.

In the control device 6A, the operation control unit 63A that controls the operation of the circulating devices 52 changes the operation level of the circulating devices 52. That is, the operation control unit 63A lowers the operation level of the circulating devices 52 compared to that in the case where the operation level of the circulating devices 52 is the second operation level as the high level after the start of lighting of the light source 41 before the start period PA as the predetermined period elapses. Thereby, the cooling liquid within the casing 51 does not largely flow, and the temperature of the cooling liquid near the modulation parts of the light modulation devices LV at the temperatures rising with incidence of light from the light source 41 may be quickly raised. Accordingly, even in the case where the focus adjustment of the projected image is performed at the time closer to the start of lighting, the temperature difference between the temperature T of the cooling liquid and the target temperature Ts at the time may be made smaller. Thereby, the difference between the refractive indexes of the cooling liquid at the respective times may be made smaller. Therefore, production of the focus shift may be suppressed.

The operation control unit 63A of the control device 6A alternately executes the low-level control as the first control of controlling the operation of the circulating devices 52 at the first operation level and the high-level control as the second control of controlling the operation of the circulating devices 52 at the second operation level. The velocity of the cooling liquid circulating on the light exiting sides of the modulation parts of the light modulation devices LV when the circulating devices 52 are controlled at the second operation level is higher than the velocity of the cooling liquid circulating on the light exiting sides of the modulation parts of the light modulation devices LV when the circulating devices 52 are controlled at the first operation level. According to the configuration, the low-level control and the high-level control are alternately executed by the control device 6A and the velocity of the cooling liquid circulated by the circulating devices 52 is changed, and thereby, the temperature of the cooling liquid near the modulation parts may be maintained in the temperature range independent of the environmental temperature or the like. Therefore, the light modulation devices LV may be stably operated.

The operation control unit 63A of the control device 6A executes the low-level control of setting the operation level of the circulating devices 52 to the first operation level as the low level after the start of lighting of the light source 41 before the start period PA as the predetermined period. Accordingly, the cooling liquid at the lower flow rate circulates in the modulation parts of the light modulation devices LV, and thereby, the temperature of the cooling liquid near the modulation parts may be easily raised. Therefore, the temperature of the cooling liquid near the modulation parts may be quickly raised and production of the focus shift may be suppressed.

The operation control unit 63A of the control device 6A stops the circulating devices 52 in the low-level control executed in the start period. Accordingly, the temperature of the cooling liquid near the modulation parts of the light modulation devices LV may be easily raised. Therefore, production of the focus shift may be suppressed.

The operation control unit 63A of the control device 6A changes the operation level of the circulating devices 52 based on the elapsed time after the start of lighting of the light source 41. Accordingly, the temperature of the cooling liquid may be controlled without a detection device such as a sensor that measures the state of the cooling liquid and the state of the projected image.

The operation control unit 63A of the control device 6A changes the operation level of the circulating devices 52 so that the temperature of the cooling liquid may fall within the temperature range including the target temperature Ts. Accordingly, the temperature of the cooling liquid may be maintained nearly constant and the temperatures of the light modulation devices LV to be cooled by the cooling liquid may be maintained nearly constant. Therefore, the light modulation devices LV and thus the projector may be stably operated.

Second Embodiment

Next, the second embodiment of the invention will be explained.

A projector according to the embodiment has the same configuration as the above described projector 1. However, in the projector according to the embodiment, the control device controls the operation of the circulating devices 52 based on both the elapsed time after the start of lighting of the light source 41 and the gradation of the image formed by the light modulation devices LV. In this regard, the projector according to the embodiment and the above described projector 1 are different. Note that, in the following explanation, the same or substantially the same parts as the parts that have already been explained have the same signs and the explanation will be omitted.

Figure 6:
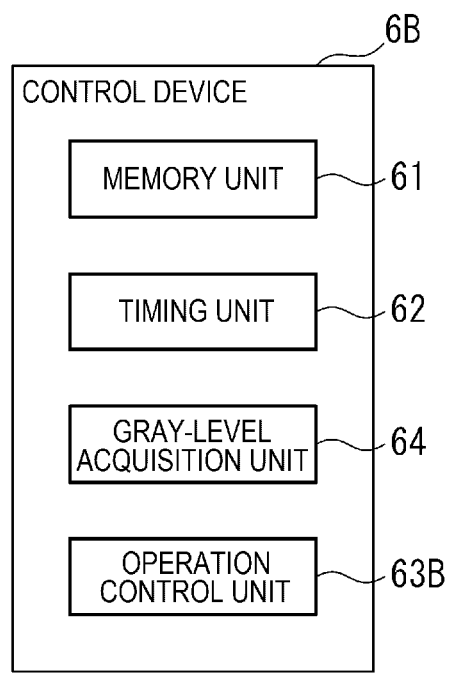
FIG. 6 is a block diagram showing a configuration of a control device of a projector according to a second embodiment of the invention.

FIG. 6 is a block diagram showing a configuration of a control device 6B of the projector according to the embodiment.

The projector according to the embodiment has the same configuration as the above described projector 1 except that the control device 6B is provided in place of the control device 6A.

Configuration of Control Device

The control device 6B has the same functions as the control device 6A. In addition, as shown in FIG. 6, the control device 6B has the memory unit 61, the timing unit 62, a gray-level acquisition unit 64, and an operation control unit 63B for execution of operation control processing, which will be described later.

Here, the light exiting-side polarizers 454 absorb the lights forming no image of the lights passing through the liquid crystal panels 453. Accordingly, for example, when an image having a gradation closer to white is formed, the amounts of lights passing through the light exiting-side polarizers 454 are larger and the amounts of absorbed lights are smaller, and thus, the amount of heat generated in the light exiting-side polarizers 454 is smaller and the temperature rise of the cooling liquid is smaller. On the other hand, for example, when an image having a gradation closer to black is formed, the amounts of lights passing through the light exiting-side polarizers 454 are smaller and the amounts of absorbed lights are larger, and thus, the amount of heat generated in the light exiting-side polarizers 454 is larger and the temperature rise of the cooling liquid is larger.

On the other hand, the control device 6B corrects the length of the start period PA based on the gradation of the image formed by the respective liquid crystal panels 453 in addition to the elapsed time. That is, the control device 6B changes the operation level of the circulating devices 52 based on both the elapsed time and the gradation of the image according to the image information input to the liquid crystal panels 453 of the light modulation devices LV.

Specifically, of the configurations of the control device 6B, the gray-level acquisition unit 64 acquires the gradation of the image formed by the respective light modulation devices LV based on the image information input to the respective light modulation devices LV. Specifically, the gray-level acquisition unit 64 acquires the gradation for one frame. The gradation for one frame is e.g. an average value of the gradations for the one frame and, hereinafter, may be referred to as "average gradation".

The operation control unit 63B controls the operation of the circulating devices 52 like the operation control unit 63A. In addition, the operation control unit 63B corrects the length of the start period PA.

Specifically, the operation control unit 63B corrects the length of the start period PA by multiplication of the length of the preset start period PA with a coefficient based on the average gradation acquired by the gray-level acquisition unit 64. The coefficient is e.g. a coefficient with which, when the average gradation is a gradation closer to white, the start period PA is longer and, when the average gradation is a gradation closer to black, the start period PA is shorter. That is, for example, the coefficient is set to a numeric value larger than 1.0 when the average gradation is a gradation closer to white, and the coefficient is set to a numeric value smaller than 1.0 when the average gradation is a gradation closer to black. In this manner, the control device 6B changes the length of the start period PA (predetermined period) based on the gradation of the formed image.

Then, if the corrected start period PA (predetermined period) has not elapsed from the start of lighting of the light source 41, that is, if the predetermined time has not elapsed from the start of lighting of the light source 41, the operation control unit 63B executes the low-level control.

On the other hand, if the corrected start period PA (predetermined period) has elapsed from the start of lighting of the light source 41, that is, if the predetermined time has elapsed from the start of lighting of the light source 41, the operation control unit 63B executes the alternating control of alternately repeating the high-level control and the low-level control as described above.

Note that, as described above, the low-level control is a control mode of setting the operation level of the circulating devices 52 to the first operation level as the low level and controlling the operation of the circulating devices 52 at the set first operation level by the control device 6B. Further, the high-level control is a control mode of setting the operation level of the circulating devices 52 to the second operation level as the high level and controlling the operation of the circulating devices 52 at the set second operation level by the control device 6B. The second operation level refers to an operation level of the circulating devices 52 at which the velocity of the cooling liquid circulating on the light exiting sides of the modulation parts of the liquid crystal panels 453 to be cooled is higher than the velocity at the first operation level.

Note that the operation control unit 63B may change the cycle of the high-level control period PH and the low-level control period PL in the alternating control period PB according to the average gradation and the elapsed time after the start of lighting of the light source 41. Further, the operation control unit 63B may also change the second operation level as the operation level at the time of the high-level control and the first operation level as the operation level at the time of the low-level control according to the average gradation and the elapsed time. Furthermore, the operation control unit 63B may also change the respective lengths of the high-level control period PH and the low-level control period PL and the ratio between the high-level control period PH and the low-level control period PL according to the average gradation and the elapsed time.

Operation Control Processing

Figure 7:
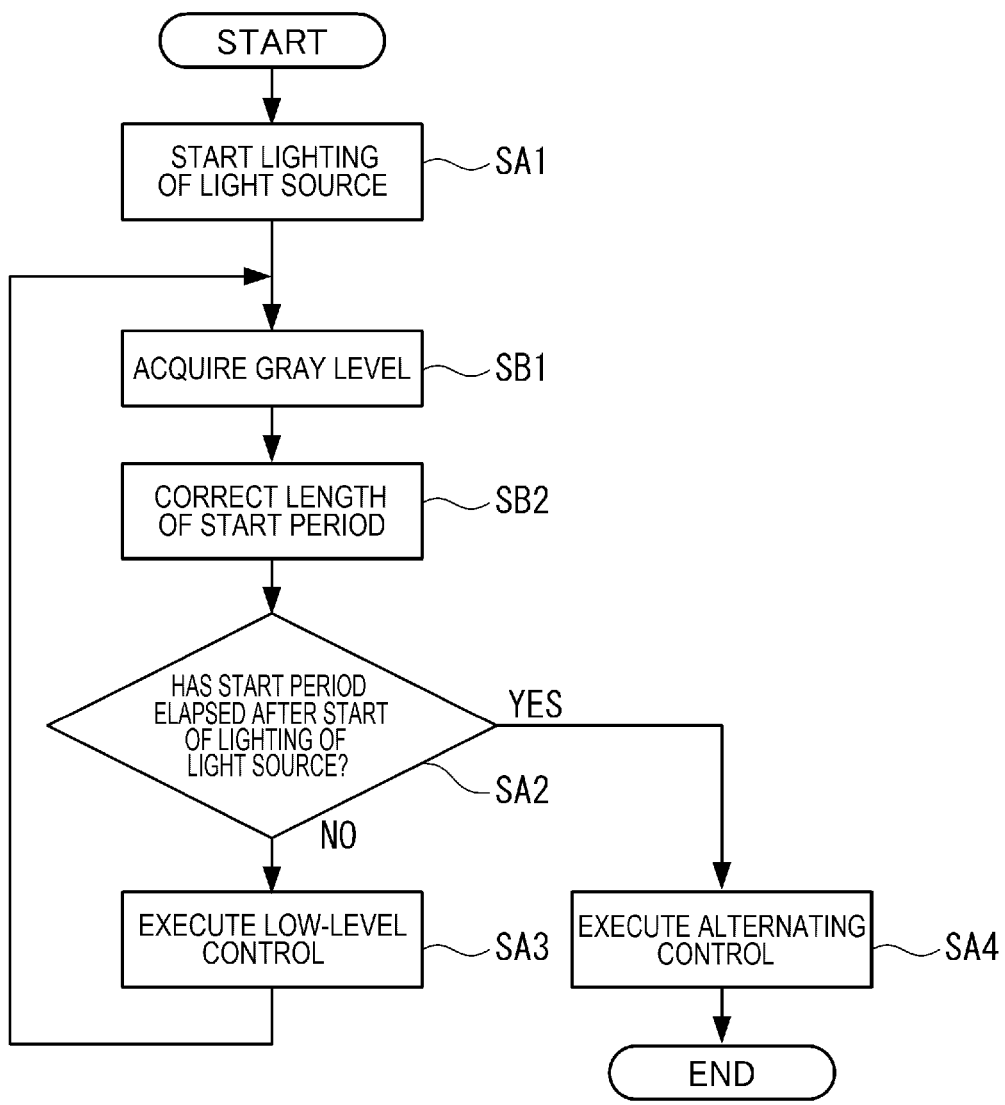
FIG. 7 is a flowchart showing operation control processing in the second embodiment.

FIG. 7 is a flowchart showing operation control processing by the control device 6B.

The control device 6B executes the following operation control processing based on drive control programs and data stored in the memory unit 61. That is, the control device 6B performs operation control processing including the operation control method according to the invention.

In the operation control processing, as shown in FIG. 7, first, the control device 6B starts lighting of the light source 41 in response to e.g. the power-on operation of the projector by the user (step SA1). Concurrently, the timing unit 62 times an elapsed time after the start of lighting of the light source 41 in the same manner as that described above.

Further, the gradation acquisition unit 64 acquires an average gradation of the image according to the image information input to the light modulation devices LV (step SB1).

Then, the operation control unit 63B corrects the length of the start period (predetermined period) based on the acquired average gradation (step SB2).

Subsequently, the operation control unit 63B executes the above described steps SA2 to SA4. Note that, in the operation control processing in the embodiment, the operation control unit 63B returns the processing to step SB1 after step SA3.

As described above, the operation control unit 63B of the control device 6B changes the operation level of the circulating devices 52 based on both the elapsed time after the start of lighting of the light source 41 and the gradation of the image according to the image information input to the light modulation devices LV.

According to the operation control processing, as is the case of the operation control processing in the projector 1, the temperature of the cooling liquid may be quickly raised from the start of lighting of the light source 41 and the temperature of the cooling liquid may be set within a predetermined temperature range around the target temperature Ts, and thereby, the image formation unit FU (particularly, the light modulation devices LV) may be maintained at a nearly constant temperature.

Advantages of Second Embodiment

According to the projector of the above described embodiment, the same advantages as those of the above described projector 1 may be offered, and additionally, the following advantages may be offered.

The operation control unit 63B of the control device 6B changes the length of the start period PA based on the gradation of the image formed by the light modulation devices LV. Specifically, when the gradation of the formed image is a gradation closer to white, the operation control unit 63B makes the start period PA longer. Accordingly, the temperature of the cooling liquid may be easily raised from the start of lighting of the light source 41. Therefore, production of the focus shift may be suppressed.

The operation control unit 63B of the control device 6B changes the operation level of the circulating devices 52 based on both the elapsed time after the start of lighting of the light source 41 and the gradation of the image according to the image information input to the light modulation devices LV. Accordingly, when the gradation of the formed image is a gradation closer to white, the start period PA after the start of lighting of the light source 41 before the operation level of the circulating devices 52 is set to the first operation level as the low level is made longer, and thereby, the temperature of the cooling liquid may be easily raised. Therefore, production of the focus shift may be suppressed.

Note that the operation control unit 63B may lower the operation level of the circulating devices 52 in the start period PA by applying a voltage lower than the voltage applied to the circulating devices 52 in the low-level control period in the alternating control period to the circulating devices 52 in the start period PA. Also, in this case, in the start period PA, the temperature of the cooling liquid near the modulation parts of the light modulation devices LV may be easily raised and the same advantages as those described above may be offered.

Third Embodiment

Next, the third embodiment of the invention will be explained.

A projector according to the embodiment has the same configuration as the above described projector 1. Here, the control device 6A in the projector 1 controls the operation level of the circulating devices 52 based on the elapsed time after the start of lighting of the light source 41. On the other hand, in the projector according to the embodiment, the control device changes the operation level of the circulating devices 52 based on the temperature of the cooling liquid within the casing 51. In this regard, the projector according to the embodiment and the above described projector 1 are different. Note that, in the following explanation, the same or substantially the same parts as the parts that have already been explained have the same signs and the explanation will be omitted.

Figure 8:
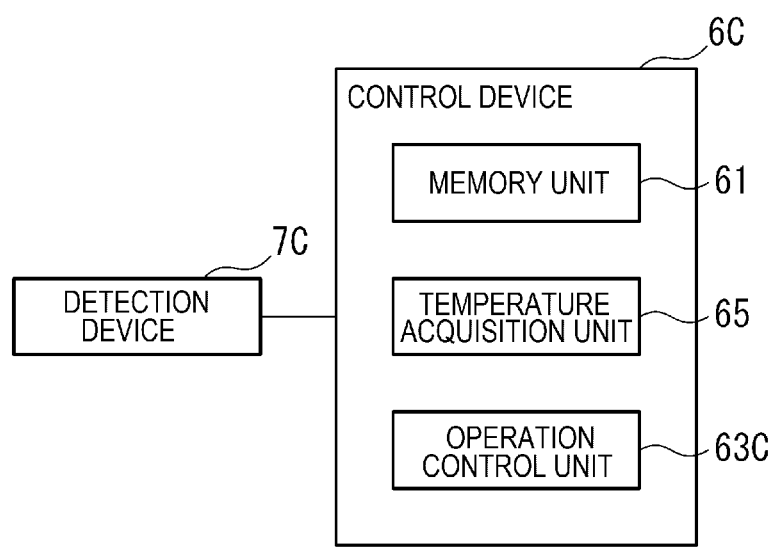
FIG. 8 is a block diagram showing configurations of a control device and a detection device of a projector according to a third embodiment of the invention.

FIG. 8 is a block diagram showing a configuration of a control device 6C and a detection device 7C of the projector according to the embodiment.

As shown in FIG. 8, the projector according to the embodiment has the same configuration and function as the above described projector 1 except that the control device 6C is provided in place of the control device 6A and the detection device 7C is further provided.

Configuration of Detection Device

The detection device 7C is provided in the casing 51 and formed with a sensor that detects the temperature of the cooling liquid within the casing 51, and outputs a detection result by the sensor to the control device 6C. Note that the part in which the detection device 7C detects the temperature of the cooling liquid may be any part as long as the temperature of the cooling liquid can be detected. However, it is more preferable that the part is a part in the optical path of the light entering the projection optical device 46 from the liquid crystal panel 453 for detection of the temperature of the cooling liquid that affects the shift of the back focus position of the projection optical device 46.

Configuration of Control Device

Like the control devices 6A, 6B, the control device 6C controls the operation of the entire projector. The control device 6C has the memory unit 61, a temperature acquisition unit 65, and an operation control unit 63C.

The temperature acquisition unit 65 acquires the detection result by the sensor of the detection device 7C, i.e., the temperature of the cooling liquid within the casing 51.

Like the operation control units 63A, 63B, the operation control unit 63C changes the operation level of the circulating devices 52 to control the operation of the circulating devices 52. In other words, the operation control unit 63C controls the operation of the circulating devices 52 so that the temperature of the cooling liquid within the casing may quickly reach the target temperature Ts and the temperature of the cooling liquid may be maintained in a predetermined temperature range around the target temperature Ts.

Specifically, the function of the operation control unit 63C is explained with reference to FIG. 5. When the temperature of the cooling liquid acquired by the temperature acquisition unit 65 is lower than the target temperature Ts, the operation control unit 63C sets the operation level of the circulating devices 52 to the first operation level as the low level, executes the low-level control of controlling the operation of the circulating devices 52 at the first operation level, and raises the temperature of the cooling liquid near the modulation parts.

On the other hand, when the acquired temperature of the cooling liquid is equal to or higher than the target temperature Ts, the operation control unit 63C sets the operation level of the circulating devices 52 to the second operation level as the high level, executes the high-level control of controlling the operation of the circulating devices 52 at the second operation level, and lowers the temperature of the cooling liquid near the modulation parts. Thereby, the temperature of the cooling liquid rising above the predetermined temperature range including the target temperature Ts is suppressed. Then, when the operation control unit 63C executes the high-level control and the target temperature Ts becomes lower than the target temperature Ts, the operation control unit 63C executes the low-level control. Thereby, the temperature of the cooling liquid takes a value close to the target temperature Ts, i.e., within the predetermined temperature range.

Under the operation control by the operation control unit 63C, the operation of the circulating devices 52 is controlled at the first operation level from the start of lighting of the light source 41, and thereby, the temperature of the cooling liquid quickly reaches the target temperature Ts. Then, after the temperature of the cooling liquid reaches the target temperature Ts, the operation control unit 63C executes the alternating control of alternately repeating the high-level control and the low-level control, and thereby, the temperature of the cooling liquid may be maintained within the predetermined temperature range including the target temperature Ts.

Note that, as described above, the second operation level is the operation level of the circulating devices 52 at which the velocity of the cooling liquid circulating along the modulation parts of the liquid crystal panels 453 to be cooled is higher than the velocity at the first operation level. Specifically, the second operation level is the operation level at which the velocity of the cooling liquid circulating on the light exiting sides of the modulation parts of the liquid crystal panels 453 is higher than the velocity at the first operation level. Further, also, in the embodiment, the operation control unit 63C stops the operation of the circulating devices 52 in the low-level control.

Operation Control Processing

Figure 9:
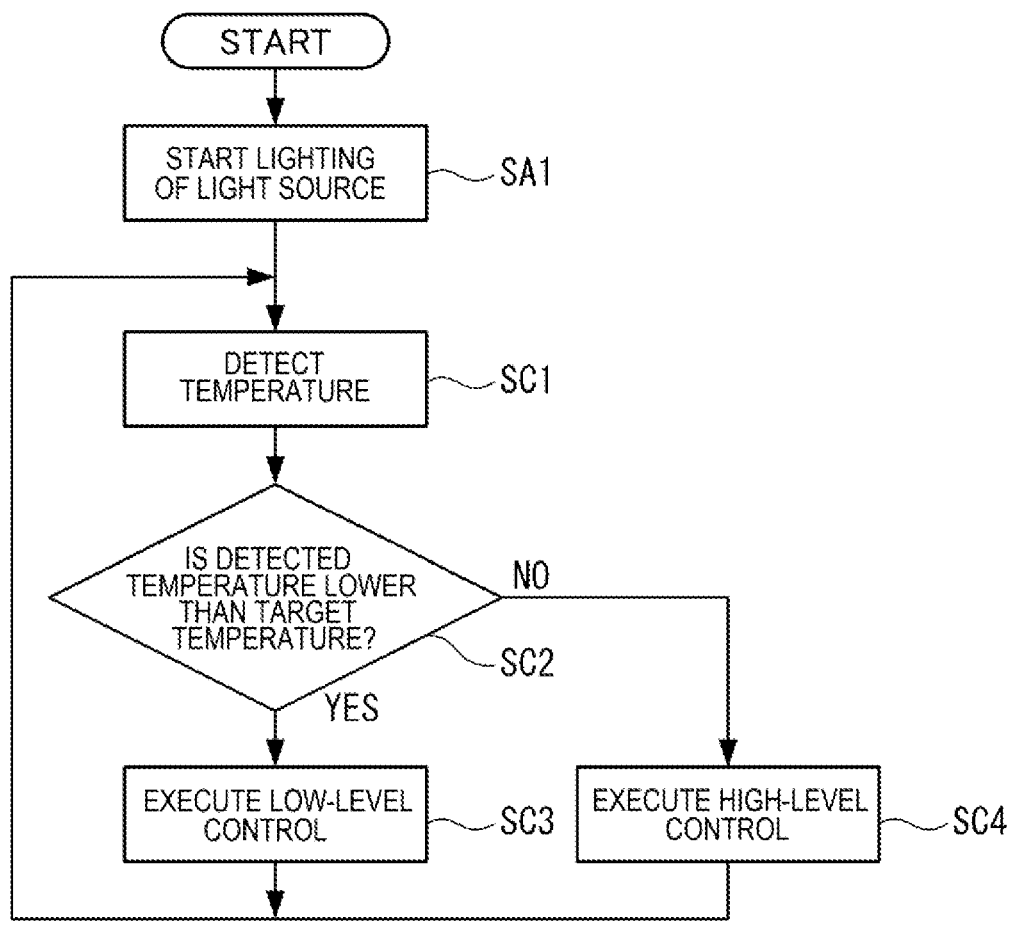
FIG. 9 is a flowchart showing operation control processing in the third embodiment.

FIG. 9 is a flowchart showing operation control processing by the control device 6C.

The control device 6C executes the following operation control processing based on drive control programs and data stored in the memory unit 61 in the same manner as that described above. That is, the control device 6C performs operation control processing including the operation control method according to the invention.

In the operation control processing, as shown in FIG. 9, first, the control device 6C starts lighting of the light source 41 in response to e.g. the power-on operation of the projector by the user (step SA1). Then, the detection device 7C detects the temperature of the cooling liquid (step SC1). Then, the temperature acquisition unit 65 acquires the temperature of the cooling liquid detected by the detection device 7C.

Subsequently, the operation control unit 63C determines whether or not the acquired temperature of the cooling liquid is lower than the target temperature Ts (step SC2).

Here, if the operation control unit 63C determines that the temperature of the cooling liquid is lower than the target temperature Ts (step SC2: YES), the operation control unit 63C executes the low-level control of controlling the operation of the circulating devices 52 at the first operation level as the low level (step SC3). Then, the control device 6C returns the processing to step SC1.

On the other hand, if the operation control unit 63C determines that the temperature of the cooling liquid is equal to or higher than the target temperature Ts (step SC2: NO), the operation control unit 63C executes the high-level control of controlling the operation of the circulating devices 52 at the second operation level as the high level (step SC4). Then, the control device 6C returns the processing to step SC1.

In the above described manner, the operation control unit 63C of the control device 6C changes the operation level of the circulating devices 52 based on the temperature of the cooling liquid detected by the detection device 7C. The operation control processing is repeatedly executed after on before off of the power of the projector. Note that the control device 6C may determine whether or not the acquired temperature of the cooling liquid is below a predetermined temperature range in the determination processing at step SC2, and, if the temperature is below the predetermined temperature range, may execute step SC3 and, if the temperature is within or above the predetermined temperature range, may execute step SC4.

Advantages of Third Embodiment

According to the projector of the above described embodiment, the same advantages as those of the above described projector 1 may be offered, and additionally, the following advantages may be offered.

The projector according to the embodiment includes the detection device 7C that detects the temperature of the cooling liquid. Further, the operation control unit 63C of the control device 6C changes the operation level of the circulating devices 52 based on the temperature of the cooling liquid detected by the detection device 7C. Accordingly, the operation of the circulating devices 52 may be controlled according to the temperature of the cooling liquid, and thereby, the temperature control of the cooling liquid may be appropriately performed. Therefore, not only the suppression of production of the focus shift but also the cooling of the light modulation devices LV may be performed.

Fourth Embodiment

Next, the fourth embodiment of the invention will be explained.

A projector according to the embodiment has the same configuration and the function as the above described projector 1, and additionally has an external cooling mechanism for cooling the cooling liquid within the casing 51 outside of the casing 51. In this regard, the projector according to the embodiment and the above described projector 1 are different.

Note that, in the following explanation, the same or substantially the same parts as the parts that have already been explained have the same signs and the explanation will be omitted.

Figure 10:
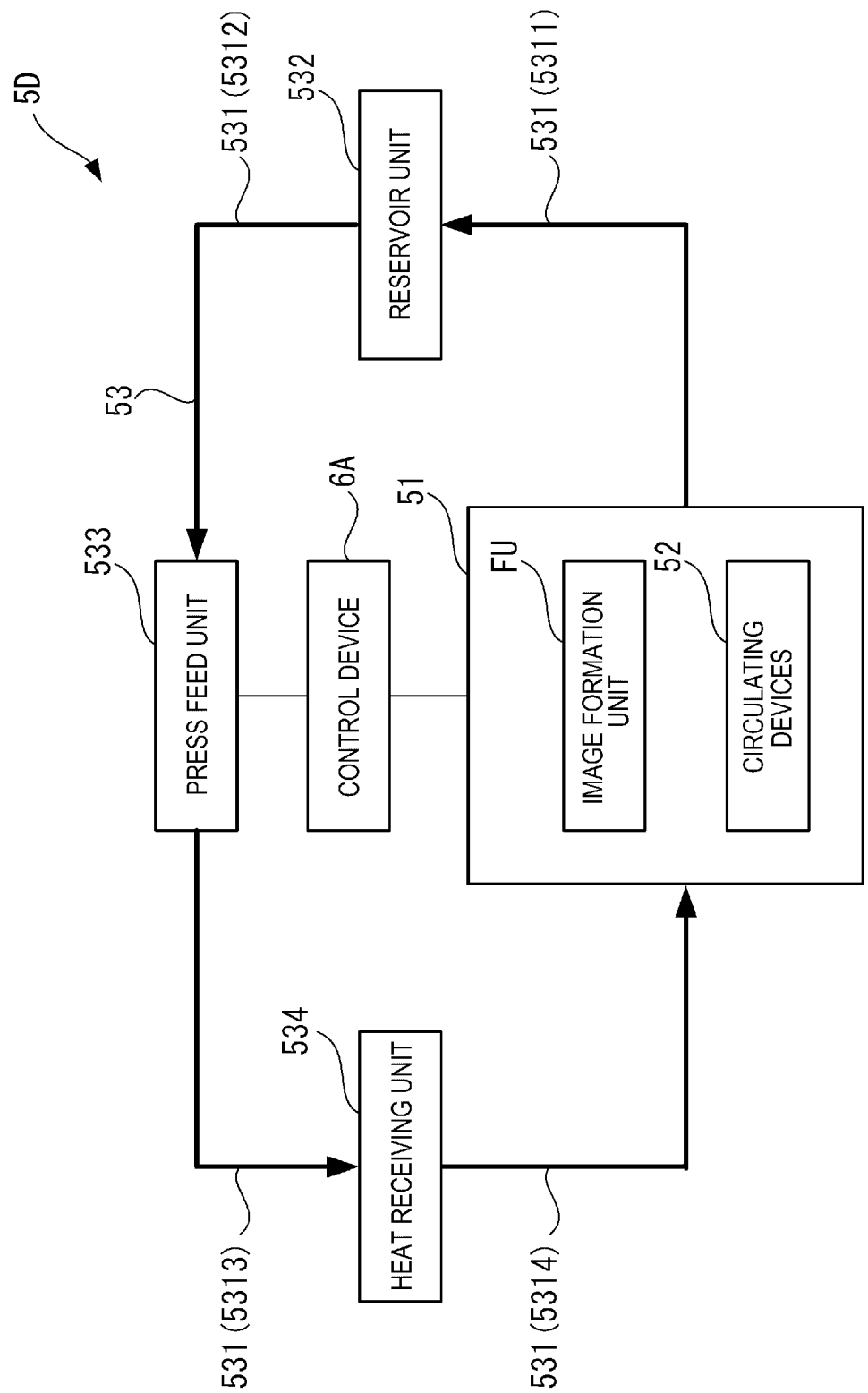
FIG. 10 is a block diagram showing configurations of a cooling device and a control device of a projector according to a fourth embodiment of the invention.

FIG. 10 is a block diagram showing a configuration of a cooling device 5D and the control device 6A of the projector according to the embodiment.

The projector according to the embodiment has the same configuration and function as the above described projector 1 except that the cooling device 5D is provided in place of the cooling device 5A.

Like the above described cooling device 5A, the cooling device 5D has the casing 51 filled with the cooling liquid and the circulating devices 52 and, as shown in FIG. 10, further has an external cooling mechanism 53 for cooling the cooling liquid within the casing 51 outside of the casing 51.

The external cooling mechanism 53 has a plurality of pipes 531, a reservoir unit 532, a press feed unit 533, and a heat receiving unit 534.

The plurality of pipes 531 (5311 to 5314) circulate the cooling liquid inside and connect the casing 51, the reservoir unit 532, the press feed unit 533, and the heat receiving unit 534 so that the cooling liquid can circulate. Specifically, the pipe 5311 connects the casing 51 and the reservoir unit 532, the pipe 5312 connects the reservoir unit 532 and the press feed unit 533, the pipe 5313 connects the press feed unit 533 and the heat receiving unit 534, and the pipe 5314 connects the heat receiving unit 534 and the casing 51.

The reservoir unit 532 is the so-called tank and provided outside of the casing 51, and temporarily stores the cooling liquid flowing from the casing 51 into the pipe 5311 inside. The reservoir unit 532 also has a function of securing air bubbles when the air bubbles are mixed into the cooling liquid.

The press feed unit 533 is the so-called pump and provided outside of the casing 51, and press-feeds the cooling liquid stored in the reservoir unit 532 to the heat receiving unit 534 via the pipe 5313.

The heat receiving unit 534 is the so-called heat-exchanger (radiator) and provided outside of the casing 51, and cools the cooling liquid by receiving heat of the cooling liquid flowing in via the pipe 5313 and releasing the heat to outside. The cooling liquid cooled by the heat receiving unit 534 circulates the casing 51 via the pipe 5314. Note that a cooling fan for cooling the heat receiving unit 534 may be provided.

Here, though the detailed illustration is omitted, for example, one end of the pipe 5314 is connected to the heat receiving unit 534 and the other end is connected to the side surface part in the −Y-direction in the casing 51. Further, one end of the pipe 5311 is connected to the reservoir unit 532 and the other end is connected to the side surface part in the +Y-direction in the casing 51. Accordingly, the cooling liquid cooled by the heat receiving unit 534 is supplied from the side surface part in the −Y-direction in the casing 51 and ejected to the external cooling mechanism 53 from the side surface part in the +Y-direction in the casing 51. Therefore, the casing 51 may be fully filled with the cooling liquid and the image formation unit FU may be immersed in the cooling liquid.

In the cooling device 5D, when the press feed unit 533 is driven, the cooling liquid flowing from the casing 51 into the reservoir unit 532 and stored is supplied to the heat receiving unit 534. The cooling liquid cooled by the heat receiving unit 534 is supplied to the casing 51. Thereby, the cooling liquid at the lower temperature is supplied into the casing 51, and the cooling liquid circulates in the respective configurations of the image formation unit FU by the circulating devices 52 and cools the image formation unit FU.

As described above, the image formation unit FU may be cooled by the cooling liquid cooled by the heat receiving unit 534, and thereby, the image formation unit FU may be cooled more effectively.

Note that the sequence of circulation of the cooling liquid in the reservoir unit 532, the press feed unit 533, and the heat receiving unit 534 in the external cooling mechanism 53 that circulates the cooling liquid outside of the casing 51 from the casing 51 by the pipes 531 can be changed as appropriate. Further, the configuration within the casing 51 may be the same as any one of the above described configurations, and the circulation direction of the cooling liquid may be the same as any one of the above described configurations. Furthermore, the number and arrangement of the circulating devices 52 within the casing 51 can be changed as appropriate.

For example, the other end of the pipe 5314 with one end connected to the heat receiving unit 534 may be connected to a part on the −Y-direction side of any one side surface part of the side surface parts in the ±X-directions and ±Z-directions of the casing 51, and the other end of the pipe 5311 with one end connected to the reservoir unit 532 may be connected to a part on the +Y-direction side of any one side surface part of the side surface parts in the ±X-directions and ±Z-directions of the casing 51. In this case, the other end of the pipe 5314 may be connected to a part on the −Y-direction side of one side surface part of the side surface parts in the ±X-directions and ±Z-directions, and the other end of the pipe 5311 may be connected to a part on the +Y-direction side of another side surface part than the one side surface part of the side surface parts in the ±X-directions and ±Z-directions. Or, the other end of the pipe 5311 may be connected to a part of the same side surface part as the side surface part to which the other end of the pipe 5314 is connected on the +Y-direction side of the part to which the other end of the pipe 5314 is connected. Further, for example, when the −Y-direction is parallel to the vertical direction, the pipe 5314 that allows the cooling liquid flowing into the casing 51 may be connected to a part on the downside in the vertical direction in the casing 51, and the pipe 5311 that allows the cooling liquid flowing out of the casing 51 may be connected to a part on the upside in the vertical direction in the casing 51.

In the embodiment, during the start period PA and the low-level control period PL in the alternating control period PB, the operation control unit 63A sets the operation level of the press feed unit 533 to the low level and controls the operation of the press feed unit 533 at the low level. Further, during the high-level control period, the operation control unit 63A sets the operation level of the press feed unit 533 to the high level and controls the operation of the press feed unit 533 at the high level. That is, the operation control unit 63A controls the operation of the circulating devices 52 and the press feed unit 533 to set the operation level of the circulating devices 52 to correspond to the operation level of the press feed unit 533. Thereby, in the high-level control period PH, the press feed unit 533 is operated at the high level and the flow rate of the cooling liquid pumped out from the press feed unit 533 is higher than the flow rate of the cooling liquid pumped out from the press feed unit 533 operated at the low level.

Note that, in the embodiment, when operating the press feed unit 533 at the low level, the operation control unit 63A stops the press feed unit 533, however, if the amount of press fed cooling liquid is lower than that at the high-level operation, the operation control unit 63A does not necessarily stop the press feed unit 533.

Further, in the embodiment, the projector includes the control device 6A, however, may include the control device 6B or control device 6C. Also, in this case, the operation control unit 63B, 63C may set the operation level of the circulating devices 52 to correspond to the operation level of the press feed unit 533 in the above described manner. Note that, in the case where the detection device 7C is provided, the detection device 7C may be provided in the external cooling mechanism 53 as long as the device can detect the temperature of the cooling liquid circulating within the casing 51.

Advantages of Fourth Embodiment

According to the projector of the above described embodiment, the same advantages as those of the above described projector 1 may be offered, and additionally, the following advantages may be offered.

The cooling device 5D includes the external cooling mechanism 53, and thereby, the temperature of the cooling liquid circulating within the casing 51 may be lowered. Therefore, the image formation unit FU (particularly, the light modulation devices LV) placed within the casing 51 may be effectively cooled.

Further, the operation of the press feed unit 533 forming the external cooling mechanism 53 is controlled by the operation control unit 63A with the circulating devices 52. Accordingly, when the temperature of the cooling liquid is raised, hindrance of the temperature rise of the cooling liquid by the cooling liquid circulate within the external cooling mechanism 53 and the casing 51 by the press feed unit 533 may be suppressed. Therefore, the temperature of the cooling liquid may be quickly raised.

Modifications of Embodiments

The invention is not limited to the above described respective embodiments, but the invention includes modifications, improvements, etc. within the range in which the purpose of the invention may be achieved.

In the above described first and fourth embodiments, the operation control unit 63A controls the operation of the circulating devices 52 based on the elapsed time after the start of lighting of the light source 41. Further, in the above described second embodiment, the operation control unit 63B controls the operation of the circulating devices 52 based on the elapsed time and the gradation (average gradation) of the formed image. Furthermore, in the above described third embodiment, the operation control unit 63C controls the operation of the circulating devices 52 based on the temperature of the cooling liquid. However, the parameters when the operation control unit controls the operation of the circulating devices 52 are not limited to those.

For example, in the case where the projector includes an imaging device such as a camera that captures the projected image, the operation of the circulating devices 52 may be controlled based on the change of the pixel size in the captured image of the projected image, i.e., the change of the pixel size in the projected image.

Here, as described above, the refractive index changes according to the temperature change of the cooling liquid, and thus, when the temperature of the cooling liquid is higher, the pixel size is larger and, when the temperature of the cooling liquid is lower, the pixel size is smaller.

Accordingly, if the determination that the pixel size becomes larger is made, the operation control unit may determine that the temperature of the cooling liquid is higher and the control device may execute the high-level control as the second control and, if the determination that the pixel size becomes smaller is made, the unit may determine that the temperature of the cooling liquid is lower and the control device may execute the low-level control as the first control.

In the above described respective embodiments, if the determination that the temperature of the cooling liquid is lower is made, the operation control unit 63A, 63B, 63C executes the low-level control as the first control and raises the temperature of the cooling liquid. However, a heating device such as a heater may be provided within the casing 51 and the heating device may be operated to raise the temperature of the cooling liquid by the operation control unit. The position of the heating device in this case may be provided within the casing 51 and, when the external cooling mechanism 53 shown in the fourth embodiment is provided, the position may be provided in the external cooling mechanism 53. Or, the above described operation control of the circulating devices 52 may be performed with heating of the cooling liquid by the heating device.

In the above described respective embodiments, the target temperature Ts is the temperature at the center in the above described temperature range. However, the target temperature Ts is not necessarily the temperature at the center in a predetermined temperature range as long as the target temperature is included in the predetermined temperature range. In other words, the above described temperature range may be set to include the target temperature Ts, and the target temperature Ts may be higher or lower than the temperature at the center in the predetermined temperature range.

In the above described respective embodiments, the image formation unit FU includes the light modulation devices LV having the light incident-side polarizers 452, the liquid crystal panels 453, and the light exiting-side polarizers 454, and the light combining device 455, and the image formation unit FU is placed within the casing 51 and immersed in the cooling liquid. However, the light incident-side polarizers 452 and the light combining device 455 are not necessarily placed within the casing and immersed in the cooling liquid.

Or, only one light modulation device LV may be provided. In this case, the light combining device 455 may be omitted. Note that, in the case where the plurality of light modulation devices LV are provided, the cooling liquid may circulate not on the light exiting sides of all of the plurality of light modulation devices LV, but on the light exiting side of one LV, for example.

The cooling liquid respectively circulates along between the inner surface of the casing 51 and the light incident-side polarizers 452, between the light incident-side polarizers 452 and the liquid crystal panels 453, between the liquid crystal panels 453 and the light exiting-side polarizers 454, between the light exiting-side polarizers 454 and the light combining device 455, and between the light combining device 455 (light exiting surface 455E) and the inner surface of the casing 51 by driving of the circulating devices 52. However, the cooling liquid does not necessarily circulate between all of these components as long as the cooling liquid may circulate between the two components located between the light modulation device LV and the projection optical device 46, particularly, between the two components located on the light exiting side with respect to the liquid crystal panel 453.

In the above described respective embodiments, the operation control unit 63A, 63B, 63C executes the low-level control as the first control of setting the operation level of the circulating devices 52 to the first operation level as the low level from the start of lighting of the light source 41 to control the operation of the circulating devices 52 at the first operation level. Specifically, the operation control unit 63A, 63B, 63C stops the circulating devices 52 from the start of lighting. However, after the start of lighting of the light source 41 before the temperature of the cooling liquid reaches the target temperature Ts, the operation control unit may temporarily set the operation level of the circulating devices 52 to a level higher than the first operation level and control the operation of the circulating devices 52 at the set level. Note that, after the start of lighting of the light source 41, for example, before the temperature of the cooling liquid reaches the target temperature Ts, if the total of lengths of the low-level control periods PL is longer than the total of lengths of the high-level control periods PH, the temperature of the cooling liquid may be quickly raised as described above.

Further, the operation control unit does not necessarily stop the circulating devices 52 in the low-level control executed in the start period PA and the low-level control period PL. For example, the operation control unit may control the operation of the circulating devices 52 at an operation level not including the stoppage of the circulating devices 52 and lower than the operation level at the high-level control (second operation level).

In the above described respective embodiments, the operation control unit 63A, 63B, 63C controls the operation of the circulating devices 52 at the single first operation level in the low-level control of the circulating devices 52. Specifically, the operation control unit 63A, 63B, 63C stops the operation of the circulating devices 52 in the low-level control. However, the operation levels set during the start period PA and the respective low-level control periods PL may be different from one another in a range below the operation levels set in the high-level control period PH.

Further, in the above described respective embodiments, the operation control unit 63A, 63B, 63C controls the operation of the circulating devices 52 at the single second operation level in the high-level control of the circulating devices 52. However, the operation levels set during the respective high-level control periods PH may be different from one another in a range above the operation levels set in the start period PA and the respective low-level control periods PL.

In the above described respective embodiments, the opening portions 511B, 511G, 511R of the casing 51 are closed by the light-transmissive members 512. However, the opening portions 511B, 511G, 511R may be closed by other optical components such as the field lenses 451, the light incident-side polarizers 452, and color filters. The same applies to the opening portion 511E.

The liquid crystal panels 453 of the light modulation devices LV employed in the above described respective embodiments may have drive units (e.g. drive ICs (Integrated Circuits)) that drive the plurality of display elements (pixels) in the liquid crystal panels 453 according to image information input to the liquid crystal panels 453 in the respective signal lines connected to the control devices 6A, 6B, 6C. Particularly, the liquid crystal panels that can form images with high resolution of 4K, 8K, or the like may have the configurations. These drive units generate heat when driving the display elements of the liquid crystal panels. Therefore, according to the cooling device in the above described respective embodiments, even in the case where the liquid crystal panels are employed as the liquid crystal panels 453, the drive units attached to the signal lines of the liquid crystal panels 453 may be efficiently cooled.

In the above described respective embodiments, the projector respectively includes the three liquid crystal panels 453 (453B, 453G, 453R). However, the invention can be applied to a projector including two or less or four or more liquid crystal panels.

In the above described respective embodiments, the image projection device 4 having the layout and the optical components shown in FIG. 1 is exemplified. However, the image projection device 4 having other layout and optical components may be employed.

In the above described respective embodiments, the liquid crystal panel 453 is the transmissive liquid crystal panel having the different light incident surface and light exiting surface. However, the liquid crystal panel 453 may be a reflective liquid crystal panel having a surface serving as both a light incident surface and a light exiting surface.

Further, the light modulation device LV includes the light incident-side polarizer 452, the liquid crystal panel 453, and the light exiting-side polarizer 454. However, the light modulation device LV may further include another optical element such as an optical compensator.

Furthermore, any other light modulation device that can modulate incident luminous flux and form an image according to image information using a micromirror such as e.g. DMD (Digital Micromirror Device) than the liquid crystal device may be used.

The entire disclosure of Japanese Patent Application No. 2018-013824, filed Jan. 30, 2018 and No. 2018-201565, filed Oct. 26, 2018 are expressly incorporated by reference herein.

What is claimed is:
1. A projector comprising:
a light source;
a light modulation device configured to modulate a light emitted from the light source;
a projection optical device configured to project the light modulated by the light modulation device;
a casing containing at least a part of the light modulation device and having an interior filled with a cooling liquid;
a circulating device configured to circulate the cooling liquid at least to a light exiting side of a modulation part in the light modulation device; and a control device configured to control an operation of the circulating device, wherein the control device changes an operation level of the circulating device, the control device alternately executes
- a first control of controlling the operation of the circulating device at a first operation level and
- a second control of controlling the operation of the circulating device at a second operation level, and a velocity of the cooling liquid circulating on the light exiting side of the modulation part when the circulating device is controlled at the second operation level is higher than a velocity of the cooling liquid circulating on the light exiting side of the modulation part when the circulating device is controlled at the first operation level.

2. The projector according to claim 1,
wherein the control device executes the first control during a predetermined period after a start of lighting of the light source.

3. The projector according to claim 2,
wherein the control device stops the operation of the circulating device in the first control executed during the predetermined period.

4. The projector according to claim 2,
wherein the control device changes a length of the predetermined period based on a gradation of an image according to image information input to the light modulation device.

5. A projector comprising:
a light source;
a light modulation device configured to modulate a light emitted from the light source;
a projection optical device configured to project the light modulated by the light modulation device;
a casing containing at least a part of the light modulation device and having an interior filled with a cooling liquid;
a circulating device configured to circulate the cooling liquid at least to a light exiting side of a modulation part in the light modulation device; and
a control device configured to control an operation of the circulating device, wherein
the control device changes an operation level of the circulating device, and the control device changes the operation level of the circulating device based on an elapsed time after the start of lighting of the light source.

6. The projector according to claim 5,
wherein the control device changes the operation level based on both the elapsed time and a gradation of an image according to image information input to the light modulation device.

7. The projector according to claim 1, further comprising
a detection device configured to detect a temperature of the cooling liquid,
wherein the control device changes the operation level based on the temperature of the cooling liquid detected by the detection device.

8. A projector comprising:
a light source;
a light modulation device configured to modulate a light emitted from the light source;
a projection optical device configured to project the light modulated by the light modulation device;
a casing containing at least a part of the light modulation device and having an interior filled with a cooling liquid;
a circulating device configured to circulate the cooling liquid at least to a light exiting side of a modulation part in the light modulation device; and
a control device configured to control an operation of the circulating device, wherein
the control device changes an operation level of the circulating device, and
the control device changes the operation level so that a temperature of the cooling liquid falls within a predetermined temperature range.

9. An operation control method of a projector including a light source, a light modulation device configured to modulate a light emitted from the light source, a casing containing at least a part of the light modulation device and having an interior filled with a cooling liquid, and a circulating device configured to circulate the cooling liquid at least to a light exiting side of a modulation part in the light modulation device, the method comprising
changing an operation level of the circulating device so that a temperature of the cooling liquid falls within a predetermined temperature range.

* * * * *